(12) United States Patent
Dropps et al.

(10) Patent No.: US 7,522,522 B2
(45) Date of Patent: Apr. 21, 2009

(54) METHOD AND SYSTEM FOR REDUCING LATENCY AND CONGESTION IN FIBRE CHANNEL SWITCHES

(75) Inventors: Frank R. Dropps, Maple Grove, MN (US); Craig M. Verba, Maple Grove, MN (US)

(73) Assignee: QLogic, Corporation, Aliso Viejo, CA (US)

( * ) Notice: Subject to any disclaimer, the term of this patent is extended or adjusted under 35 U.S.C. 154(b) by 860 days.

(21) Appl. No.: 10/894,595

(22) Filed: Jul. 20, 2004

(65) Prior Publication Data

US 2005/0018603 A1    Jan. 27, 2005

Related U.S. Application Data

(60) Provisional application No. 60/572,197, filed on May 18, 2004, provisional application No. 60/569,436, filed on May 7, 2004, provisional application No. 60/557,613, filed on Mar. 30, 2004, provisional application No. 60/550,250, filed on Mar. 4, 2004, provisional application No. 60/537,933, filed on Jan. 21, 2004, provisional application No. 60/532,967, filed on Dec. 29, 2003, provisional application No. 60/532,966, filed on Dec. 29, 2003, provisional application No. 60/532,965, filed on Dec. 29, 2003, provisional application No. 60/532,963, filed on Dec. 29, 2003, provisional application No. 60/505,381, filed on Sep. 23, 2003, provisional application No. 60/505,195, filed on Sep. 23, 2003, provisional application No. 60/505,075, filed on Sep. 23, 2003, provisional application No. 60/504,950, filed on Sep. 19, 2003, provisional application No. 60/504,038, filed on Sep. 19, 2003, provisional application No. 60/503,812, filed on Sep. 19, 2003, provisional application No. 60/503,809, filed on Sep. 19, 2003, provisional application No. 60/495,212, filed on Aug. 14, 2003, provisional application No. 60/495,165, filed on Aug. 14, 2003, provisional application No. 60/488,757, filed on Jul. 21, 2003.

(51) Int. Cl.
*H04L 12/26* (2006.01)
(52) U.S. Cl. .................................. 370/230.1; 370/235.1
(58) Field of Classification Search ................. 370/229, 370/230, 230.1, 235, 235.1, 236
See application file for complete search history.

(56) References Cited

U.S. PATENT DOCUMENTS 4,081,612 A   3/1978   Hafner
(Continued)

FOREIGN PATENT DOCUMENTS

EP         0649098        9/1994
(Continued)

OTHER PUBLICATIONS

"Office Action from USPTO dated Mar. 21, 2006 for U.S. Appl. No. 10/889,588".

(Continued)

*Primary Examiner*—Kwang B Yao
*Assistant Examiner*—Andrew Lai
(74) *Attorney, Agent, or Firm*—Klein, O'Neill & Singh, LLP

(57) ABSTRACT

A method and system for routing fiber channel frames using a fiber channel switch element is provided. The switch element includes, a port with a buffer having more than one memory slot for receiving fiber channel frames, wherein the port tracks a relative age of a first memory slot with respect to at least another memory slot; and frames are transmitted from a memory slot based on the relative age. The method includes, determining a relative age of a first memory slot with respect to at least another memory slot; and transmitting a frame from a memory slot based on the relative age. The method also includes, sending frames that have resided in a memory slot for a greater period compared to frames residing in at least another memory slot; and setting age bits in plural memory slots when frames are written and the relative age is determined based on the age bits. An aging table may be used to store the age bits of the plural memory slots.

10 Claims, 18 Drawing Sheets

U.S. PATENT DOCUMENTS

| | | | |
|---|---|---|---|
| 4,162,375 A | 7/1979 | Schlichte | 179/15 |
| 4,200,929 A | 4/1980 | Davidjuk et al. | |
| 4,258,418 A | 3/1981 | Heath | |
| 4,344,132 A | 8/1982 | Dixon et al. | |
| 4,382,159 A | 5/1983 | Bowditch | |
| 4,425,640 A | 1/1984 | Philip et al. | 370/58 |
| 4,546,468 A | 10/1985 | Christmas et al. | 370/54 |
| 4,569,043 A | 2/1986 | Simmons et al. | 370/63 |
| 4,691,296 A | 9/1987 | Struger | |
| 4,716,561 A | 12/1987 | Angell et al. | |
| 4,725,835 A | 2/1988 | Schreiner et al. | 340/825.83 |
| 4,821,034 A | 4/1989 | Anderson et al. | 340/825 |
| 4,860,193 A | 8/1989 | Bentley et al. | |
| 4,980,857 A | 12/1990 | Walter et al. | |
| 5,025,370 A | 6/1991 | Koegel et al. | |
| 5,051,742 A | 9/1991 | Hullett et al. | |
| 5,090,011 A | 2/1992 | Fukuta et al. | |
| 5,115,430 A | 5/1992 | Hahne et al. | |
| 5,144,622 A | 9/1992 | Takiyasu et al. | 370/85.13 |
| 5,258,751 A * | 11/1993 | DeLuca et al. | 340/7.52 |
| 5,260,933 A | 11/1993 | Rouse | |
| 5,260,935 A * | 11/1993 | Turner | 370/394 |
| 5,339,311 A | 8/1994 | Turner | |
| 5,367,520 A | 11/1994 | Cordell | 370/60 |
| 5,390,173 A | 2/1995 | Spinney et al. | |
| 5,537,400 A * | 7/1996 | Diaz et al. | 370/412 |
| 5,568,165 A | 10/1996 | Kimura | |
| 5,568,614 A | 10/1996 | Mendelson et al. | |
| 5,590,125 A | 12/1996 | Acampora et al. | |
| 5,594,672 A | 1/1997 | Hicks | |
| 5,598,541 A | 1/1997 | Malladi | 395/286 |
| 5,610,745 A | 3/1997 | Bennett | 359/139 |
| 5,623,492 A | 4/1997 | Teraslinna | |
| 5,666,483 A | 9/1997 | McClary | |
| 5,677,909 A | 10/1997 | Heide | |
| 5,687,172 A | 11/1997 | Cloonan et al. | 370/395 |
| 5,701,416 A | 12/1997 | Thorson et al. | |
| 5,706,279 A | 1/1998 | Teraslinna | |
| 5,732,206 A | 3/1998 | Mendel | |
| 5,748,612 A | 5/1998 | Stoevhase et al. | 370/230 |
| 5,764,927 A | 6/1998 | Murphy et al. | |
| 5,768,271 A | 6/1998 | Seid et al. | |
| 5,768,533 A | 6/1998 | Ran | |
| 5,784,358 A | 7/1998 | Smith et al. | |
| 5,790,545 A | 8/1998 | Holt et al. | |
| 5,790,840 A | 8/1998 | Bulka et al. | |
| 5,812,525 A | 9/1998 | Teraslinna | |
| 5,818,842 A | 10/1998 | Burwell et al. | 370/397 |
| 5,821,875 A | 10/1998 | Lee et al. | |
| 5,822,300 A | 10/1998 | Johnson et al. | |
| 5,825,748 A | 10/1998 | Barkey et al. | |
| 5,828,475 A | 10/1998 | Bennett et al. | |
| 5,835,752 A | 11/1998 | Chiang et al. | |
| 5,850,386 A | 12/1998 | Anderson et al. | |
| 5,894,560 A | 4/1999 | Carmichael et al. | |
| 5,936,442 A | 8/1999 | Liu et al. | |
| 5,954,796 A | 9/1999 | McCarty et al. | |
| 5,974,547 A | 10/1999 | Klimenko | |
| 5,978,359 A | 11/1999 | Caldara et al. | |
| 5,978,379 A | 11/1999 | Chan et al. | |
| 5,987,028 A | 11/1999 | Yang et al. | 370/380 |
| 5,999,528 A | 12/1999 | Chow et al. | 370/365 |
| 6,011,779 A | 1/2000 | Wills | |
| 6,014,383 A | 1/2000 | McCarty | 370/453 |
| 6,021,128 A | 2/2000 | Hosoya et al. | 370/380 |
| 6,026,092 A | 2/2000 | Abu-Amara et al. | |
| 6,031,842 A | 2/2000 | Trevitt et al. | |
| 6,046,979 A | 4/2000 | Bauman | |
| 6,047,323 A | 4/2000 | Krause | 709/227 |
| 6,055,618 A | 4/2000 | Thorson | |
| 6,061,360 A | 5/2000 | Miller et al. | |
| 6,081,512 A | 6/2000 | Muller et al. | 370/256 |
| 6,108,738 A | 8/2000 | Chambers et al. | |
| 6,108,778 A | 8/2000 | LaBerge | |
| 6,118,776 A | 9/2000 | Berman | |
| 6,128,292 A | 10/2000 | Kim et al. | 370/356 |
| 6,134,127 A * | 10/2000 | Kirchberg | 363/41 |
| 6,144,668 A | 11/2000 | Bass et al. | |
| 6,151,644 A | 11/2000 | Wu | |
| 6,158,014 A | 12/2000 | Henson | |
| 6,160,813 A | 12/2000 | Banks et al. | 370/422 |
| 6,185,203 B1 | 2/2001 | Berman | |
| 6,201,787 B1 | 3/2001 | Baldwin et al. | |
| 6,209,089 B1 | 3/2001 | Selitrennikoff et al. | |
| 6,229,822 B1 | 5/2001 | Chow et al. | |
| 6,230,276 B1 | 5/2001 | Hayden | |
| 6,240,096 B1 | 5/2001 | Book | |
| 6,252,891 B1 | 6/2001 | Perches | |
| 6,253,267 B1 | 6/2001 | Kim et al. | |
| 6,286,011 B1 | 9/2001 | Velamuri et al. | |
| 6,289,002 B1 | 9/2001 | Henson et al. | |
| 6,301,612 B1 | 10/2001 | Selitrennikoff et al. | |
| 6,307,857 B1 * | 10/2001 | Yokoyama et al. | 370/395.72 |
| 6,308,220 B1 | 10/2001 | Mathur | 709/238 |
| 6,324,181 B1 | 11/2001 | Wong et al. | 370/403 |
| 6,330,236 B1 | 12/2001 | Ofek et al. | 370/369 |
| 6,333,932 B1 | 12/2001 | Kobayasi et al. | |
| 6,335,935 B2 | 1/2002 | Kadambi et al. | |
| 6,343,324 B1 | 1/2002 | Hubis et al. | |
| 6,353,612 B1 | 3/2002 | Zhu et al. | |
| 6,370,605 B1 | 4/2002 | Chong | |
| 6,401,128 B1 | 6/2002 | Stai et al. | |
| 6,404,749 B1 | 6/2002 | Falk | |
| 6,411,599 B1 | 6/2002 | Blanc et al. | 370/219 |
| 6,411,627 B1 | 6/2002 | Hullett et al. | |
| 6,418,477 B1 | 7/2002 | Verma | |
| 6,421,342 B1 | 7/2002 | Schwartz et al. | |
| 6,421,711 B1 | 7/2002 | Blumenau et al. | |
| 6,424,658 B1 | 7/2002 | Mathur | 370/429 |
| 6,438,628 B1 | 8/2002 | Messerly et al. | |
| 6,449,274 B1 | 9/2002 | Holden et al. | 370/392 |
| 6,452,915 B1 | 9/2002 | Jorgensen | |
| 6,467,008 B1 | 10/2002 | Gentry et al. | 710/261 |
| 6,470,026 B1 | 10/2002 | Pearson et al. | |
| 6,509,988 B1 | 1/2003 | Saito | |
| 6,522,656 B1 | 2/2003 | Gridley | |
| 6,532,212 B1 | 3/2003 | Soloway et al. | |
| 6,570,850 B1 | 5/2003 | Gutierrez et al. | |
| 6,570,853 B1 | 5/2003 | Johnson et al. | |
| 6,594,231 B1 | 7/2003 | Byham et al. | |
| 6,597,691 B1 | 7/2003 | Anderson et al. | 370/360 |
| 6,597,777 B1 | 7/2003 | Ho | |
| 6,606,690 B2 | 8/2003 | Padovano | |
| 6,614,796 B1 | 9/2003 | Black et al. | |
| 6,622,206 B1 | 9/2003 | Kanamaru et al. | |
| 6,643,298 B1 | 11/2003 | Brunheroto et al. | |
| 6,657,962 B1 | 12/2003 | Barri et al. | |
| 6,684,209 B1 | 1/2004 | Ito et al. | |
| 6,697,359 B1 | 2/2004 | George | 370/357 |
| 6,697,368 B2 | 2/2004 | Chang et al. | |
| 6,697,914 B1 | 2/2004 | Hospodor et al. | |
| 6,718,497 B1 | 4/2004 | Whitby-Strevens | |
| 6,738,381 B1 | 5/2004 | Agnevik et al. | |
| 6,744,772 B1 | 6/2004 | Eneboe et al. | |
| 6,760,302 B1 | 7/2004 | Ellinas et al. | |
| 6,779,083 B2 | 8/2004 | Ito et al. | |
| 6,807,181 B1 | 10/2004 | Weschler | |
| 6,816,492 B1 | 11/2004 | Turner et al. | |
| 6,816,750 B1 | 11/2004 | Klaas | |
| 6,859,435 B1 | 2/2005 | Lee et al. | |
| 6,865,157 B1 | 3/2005 | Scott et al. | |
| 6,888,831 B1 | 5/2005 | Hospodor et al. | |
| 6,901,072 B1 | 5/2005 | Wong | |
| 6,904,507 B2 | 6/2005 | Gil | |

| | | | | | |
|---|---|---|---|---|---|
| 6,922,408 B2 | 7/2005 | Bloch et al. | 2002/0156918 A1 | 10/2002 | Valdevit et al. |
| 6,928,470 B1 | 8/2005 | Hamlin | 2002/0159385 A1 | 10/2002 | Susnow et al. |
| 6,934,799 B2 | 8/2005 | Acharya et al. | 2002/0172195 A1 | 11/2002 | Pekkala et al. |
| 6,941,357 B2 | 9/2005 | Nguyen et al. | 2002/0174197 A1 | 11/2002 | Schimke et al. |
| 6,941,482 B2 | 9/2005 | Strong | 2002/0191602 A1 | 12/2002 | Woodring et al. |
| 6,947,393 B2 | 9/2005 | Hooper, III | 2002/0194294 A1 | 12/2002 | Blumenau et al. |
| 6,952,659 B2 | 10/2005 | King et al. | 2002/0196773 A1 | 12/2002 | Berman |
| 6,968,463 B2 | 11/2005 | Pherson et al. | 2003/0002503 A1 | 1/2003 | Brewer et al. |
| 6,987,768 B1 | 1/2006 | Kojima et al. | 2003/0016683 A1 | 1/2003 | George et al. |
| 6,988,130 B2 | 1/2006 | Blumenau et al. | 2003/0021239 A1 | 1/2003 | Mullendore et al. |
| 6,988,149 B2 | 1/2006 | Odenwald | 2003/0026267 A1 | 2/2003 | Oberman et al. |
| 7,000,025 B1 | 2/2006 | Wilson | 2003/0026287 A1 | 2/2003 | Mullendore et al. |
| 7,002,926 B1 | 2/2006 | Eneboe et al. | 2003/0033487 A1 | 2/2003 | Pfister et al. |
| 7,010,607 B1 | 3/2006 | Bunton | 2003/0035433 A1 | 2/2003 | Craddock et al. |
| 7,024,410 B2 | 4/2006 | Ito et al. | 2003/0046396 A1 | 3/2003 | Richter et al. |
| 7,039,070 B2 | 5/2006 | Kawakatsu | 2003/0056000 A1 | 3/2003 | Mullendore et al. |
| 7,039,870 B2 | 5/2006 | Takaoka et al. | 2003/0072316 A1 | 4/2003 | Niu et al. |
| 7,047,326 B1 | 5/2006 | Crosbie et al. | 2003/0076788 A1 | 4/2003 | Grabauskas et al. |
| 7,050,392 B2 | 5/2006 | Valdevit | 2003/0079019 A1 | 4/2003 | Lolayekar et al. |
| 7,051,182 B2 | 5/2006 | Blumenau et al. | 2003/0084219 A1 | 5/2003 | Yao et al. |
| 7,055,068 B2 | 5/2006 | Riedl | 2003/0086377 A1 | 5/2003 | Berman |
| 7,061,862 B2 | 6/2006 | Horiguchi et al. | 2003/0091062 A1 | 5/2003 | Lay et al. |
| 7,061,871 B2 | 6/2006 | Sheldon et al. | 2003/0093607 A1 | 5/2003 | Main et al. |
| 7,076,569 B1 | 7/2006 | Bailey et al. | 2003/0103451 A1 | 6/2003 | Lutgen et al. |
| 7,092,374 B1 | 8/2006 | Gubbi | 2003/0115355 A1 | 6/2003 | Cometto et al. |
| 7,110,394 B1 | 9/2006 | Chamdani et al. | 2003/0117961 A1 | 6/2003 | Chuah et al. |
| 7,120,728 B2 | 10/2006 | Krakirian et al. | 2003/0118053 A1 | 6/2003 | Edsall et al. |
| 7,123,306 B1 | 10/2006 | Goto et al. | 2003/0120743 A1 | 6/2003 | Coatney et al. |
| 7,124,169 B2 | 10/2006 | Shimozono et al. | 2003/0120983 A1 | 6/2003 | Vieregge et al. |
| 7,150,021 B1 | 12/2006 | Vajjhala et al. | 2003/0126223 A1 | 7/2003 | Jenne et al. |
| 7,151,778 B2 | 12/2006 | Zhu et al. | 2003/0126242 A1 | 7/2003 | Chang |
| 7,171,050 B2 | 1/2007 | Kim | 2003/0131105 A1 | 7/2003 | Czeiger et al. |
| 7,185,062 B2 | 2/2007 | Lolayekar et al. | 2003/0137941 A1 | 7/2003 | Kaushik et al. |
| 7,187,688 B2 | 3/2007 | Garmire et al. | 2003/0139900 A1 | 7/2003 | Robison |
| 7,188,364 B2 | 3/2007 | Volpano | 2003/0172149 A1 | 9/2003 | Edsall et al. |
| 7,190,667 B2 | 3/2007 | Susnow et al. | 2003/0172239 A1 | 9/2003 | Swank |
| 7,194,538 B1 | 3/2007 | Rabe et al. | 2003/0174652 A1 | 9/2003 | Ebata |
| 7,200,108 B2 | 4/2007 | Beer et al. | 2003/0174721 A1 | 9/2003 | Black et al. |
| 7,200,610 B1 | 4/2007 | Prawdiuk et al. | 2003/0174789 A1 | 9/2003 | Waschura et al. |
| 7,209,478 B2 | 4/2007 | Rojas et al. | 2003/0179709 A1 | 9/2003 | Huff |
| 7,215,680 B2 | 5/2007 | Mullendore et al. | 2003/0179748 A1 | 9/2003 | George et al. ............... 370/389 |
| 7,221,650 B1 | 5/2007 | Cooper et al. | 2003/0179755 A1 | 9/2003 | Fraser |
| 7,230,929 B2 | 6/2007 | Betker et al. | 2003/0189930 A1 | 10/2003 | Terrell et al. |
| 7,233,985 B2 | 6/2007 | Hahn et al. | 2003/0189935 A1 | 10/2003 | Warden et al. |
| 7,245,613 B1 | 7/2007 | Winkles et al. | 2003/0191857 A1 | 10/2003 | Terell et al. |
| 7,248,580 B2 | 7/2007 | George et al. | 2003/0195983 A1 | 10/2003 | Krause |
| 6,785,241 B1 | 8/2007 | Lu et al. | 2003/0198238 A1 | 10/2003 | Westby |
| 7,263,593 B2 | 8/2007 | Honda et al. | 2003/0218986 A1 | 11/2003 | DeSanti et al. |
| 7,266,286 B2 | 9/2007 | Tanizawa et al. | 2003/0229808 A1 | 12/2003 | Heintz et al. |
| 7,269,131 B2 | 9/2007 | Cashman et al. | 2003/0236953 A1 | 12/2003 | Grieff et al. |
| 7,269,168 B2 | 9/2007 | Roy et al. | 2004/0013088 A1 | 1/2004 | Gregg |
| 7,277,431 B2 | 10/2007 | Walter et al. | 2004/0013092 A1 | 1/2004 | Betker et al. |
| 7,287,063 B2 | 10/2007 | Baldwin et al. | 2004/0013113 A1 | 1/2004 | Singh et al. |
| 7,292,593 B1 | 11/2007 | Winkles et al. | 2004/0013125 A1 | 1/2004 | Betker et al. |
| 7,315,511 B2 | 1/2008 | Morita et al. | 2004/0015638 A1 | 1/2004 | Bryn |
| 7,327,680 B1 | 2/2008 | Kloth | 2004/0024831 A1 | 2/2004 | Yang et al. |
| 7,346,707 B1 | 3/2008 | Erimli | 2004/0028038 A1 | 2/2004 | Anderson et al. |
| 7,352,740 B2 | 4/2008 | Hammons et al. | 2004/0054776 A1 | 3/2004 | Klotz et al. |
| 2001/0011357 A1 | 8/2001 | Mori | 2004/0054866 A1 | 3/2004 | Blumenau et al. |
| 2001/0022823 A1 | 9/2001 | Renaud | 2004/0057389 A1 | 3/2004 | Klotz et al. |
| 2001/0033552 A1 | 10/2001 | Barrack et al. | 2004/0064664 A1 | 4/2004 | Gil |
| 2001/0038628 A1 | 11/2001 | Ofek et al. | 2004/0081186 A1 | 4/2004 | Warren et al. |
| 2001/0043564 A1 | 11/2001 | Bloch et al. | 2004/0081196 A1 | 4/2004 | Elliott |
| 2001/0047460 A1 | 11/2001 | Kobayashi et al. | 2004/0081394 A1 | 4/2004 | Biran et al. |
| 2002/0016838 A1 | 2/2002 | Geluc et al. | 2004/0085955 A1 | 5/2004 | Walter et al. |
| 2002/0034178 A1 | 3/2002 | Schmidt et al. | 2004/0085974 A1 | 5/2004 | Mies et al. |
| 2002/0071387 A1 | 6/2002 | Horiguchi et al. | 2004/0085994 A1 | 5/2004 | Warren et al. |
| 2002/0103913 A1 | 8/2002 | Tawil et al. | 2004/0092278 A1 | 5/2004 | Diepstraten et al. |
| 2002/0104039 A1 | 8/2002 | DeRolf et al. | 2004/0100944 A1 | 5/2004 | Richmond et al. |
| 2002/0122428 A1 | 9/2002 | Fan et al. | 2004/0109418 A1 | 6/2004 | Fedorkow et al. |
| 2002/0124124 A1 | 9/2002 | Matsumoto et al. | 2004/0123181 A1 | 6/2004 | Moon et al. |
| 2002/0147560 A1 | 10/2002 | Devins et al. | 2004/0151521 A1 | 7/2004 | Rasch et al. ............... 370/463 |
| 2002/0147843 A1 | 10/2002 | Rao | 2004/0151188 A1 | 8/2004 | Maveli et al. |

| | | |
|---|---|---|
| 2004/0153526 A1 | 8/2004 | Haun et al. |
| 2004/0153914 A1 | 8/2004 | El-Batal |
| 2004/0174813 A1 | 9/2004 | Kasper et al. |
| 2004/0202189 A1 | 10/2004 | Arndt et al. |
| 2004/0208201 A1 | 10/2004 | Otake |
| 2004/0267982 A1 | 12/2004 | Jackson et al. |
| 2005/0023656 A1 | 2/2005 | Leedy |
| 2005/0036499 A1 | 2/2005 | Dutt et al. |
| 2005/0036763 A1 | 2/2005 | Kato et al. |
| 2005/0047334 A1 | 3/2005 | Paul et al. |
| 2005/0073956 A1 | 4/2005 | Moores et al. |
| 2005/0076113 A1 | 4/2005 | Klotz et al. |
| 2005/0088969 A1 | 4/2005 | Carlsen et al. |
| 2005/0108444 A1 | 5/2005 | Flauaus et al. |
| 2005/0117522 A1 | 6/2005 | Basavaiah et al. |
| 2005/0177641 A1 | 8/2005 | Yamagami |
| 2005/0198523 A1 | 9/2005 | Shanbhag et al. |
| 2006/0013248 A1 | 1/2006 | Mujeeb et al. |
| 2006/0034192 A1 | 2/2006 | Hurley et al. |
| 2006/0034302 A1 | 2/2006 | Peterson |
| 2006/0047852 A1 | 3/2006 | Shah et al. |
| 2006/0074927 A1 | 4/2006 | Sullivan et al. |
| 2006/0107260 A1 | 5/2006 | Motta |
| 2006/0143300 A1 | 6/2006 | See et al. |
| 2006/0184711 A1 | 8/2006 | Pettey et al. |
| 2006/0203725 A1 | 9/2006 | Paul et al. |
| 2006/0274744 A1 | 12/2006 | Nagai et al. |
| 2007/0206502 A1 | 9/2007 | Martin et al. |

FOREIGN PATENT DOCUMENTS

| | | |
|---|---|---|
| EP | 0856969 | 1/1998 |
| WO | WO-98/36537 | 8/1998 |
| WO | WO-01/95566 | 12/2001 |
| WO | WO03/088050 | 10/2003 |

OTHER PUBLICATIONS

"Office Action from USPTO dated Sep. 10, 2007 for U.S. Appl. No. 10/889,255".
"Office Action from USPTO dated Nov. 15, 2006 for U.S. Appl. No. 10/263,858".
"Office Action from USPTO dated Jul. 11, 2007 for U.S. Appl. No. 10/263,858".
"Office Action from USPTO dated Jan. 19, 2007 for U.S. Appl. No. 10/302,149".
"Office Action from USPTO dated Aug. 20, 2007 for U.S. Appl. No. 10/302,149".
"Office Action from USPTO dated Jul. 3, 2007 2007 for U.S. Appl. No. 10/664,548".
"Office Action from USPTO dated Sep. 20, 2007 for U.S. Appl. No. 10/798,527".
"Office Action from USPTO dated Sep. 20, 2007 for U.S. Appl. No. 10/889,267".
"Office Action from USPTO dated Aug. 31, 2007 for U.S. Appl. No. 10/889,635".
"Office Action from USPTO dated Sep. 4, 2007 for U.S. Appl. No. 10/889,551".
"Office Action from USPTO dated Sep. 20, 2007 for U.S. Appl. No. 10/889,259".
"Office Action from USPTO dated Sep. 19, 2007 for U.S. Appl. No. 10/894,492".
"Office Action from USPTO dated Oct. 4, 2007 for U.S. Appl. No. 10/894,627".
"Office Action from USPTO dated Oct. 25, 2007 for U.S. Appl. No. 10/894,491".
"Office Action from USPTO dated Oct. 23, 2007 for U.S. Appl. No. 10/894,597".
"Office Action from USPTO dated Oct. 25, 2007 for U.S. Appl. No. 10/894,579".
"Office Action from USPTO dated Oct. 11, 2007 for U.S. Appl. No. 10/894,629".
"Office Action from USPTO dated Oct. 25, 2007 for U.S. Appl. No. 10/894,536".
"Office Action from USPTO dated Nov. 13, 2007 for U.S. Appl. No. 10/894,586".
"Office Action from USPTO dated Oct. 17, 2007 for U.S. Appl. No. 10/894,917".
"Office Action from USPTO dated Jun. 28, 2007 for U.S. Appl. No. 10/894,529".
"Office Action from USPTO dated Sep. 14, 2007 for U.S. Appl.e no. 10/894,978".
"Office Action from USPTO dated Apr. 6, 2007 for U.S. Appl. No. 10/956,718".
"Office Action from USPTO dated Oct. 13, 2007 for U.S. Appl. No. 10/956,717".
"Office Action from USPTO dated Jun. 1, 2007 for U.S. Appl. No. 10/961,463".
"Office Action from USPTO dated Sep. 6, 2007 for U.S. Appl. No. 10/889,337".
Malavalli, et al., "Fibre Channel Framing and Signaling (FC-FS) REV 1.10", *NCITS working draft proposed American National Standard for Information Technology*, (Jan. 25, 2001).
"Office Action from USPTO dated Jan. 19, 2006 for U.S. Appl. No. 10/212,425".
"Office Action from UPSTO dated Dec. 5, 2006 for U.S. Appl. No. 10/212,425".
"Office Action form USPTO dated May 21, 2007 for U.S. Appl. No. 10/212,425".
"Office Action from USPTO dated Oct. 18, 2006 for U.S. Appl. No. 10/241,153".
"Office Action from USPTO dated Apr. 3, 2007 for U.S. Appl. No. 10/241,153".
"Office Action from USPTO dated Nov. 16, 2007 for U.S. Appl. No. 10/241,153".
Brown, Douglas W., "A State-Machine Synthesizer", *18th Design Automation Conference*, (1981), 301-305.
Banks, David C., et al., "Link Trunking and Measuring Link Latency in Fibre Channel Fabric", *U.S. Appl. No. 60/286,046*, 1-52.
Curtis, A. R., "Design Considerations for 10-Gbit Fibre Channel", *Curtis A. Ridgeway, Distiguished I/O Architect, Storage and Computing ASIC's Division, LSI Logic Corp.*
Malavalli, Kumar, "High Speed Fibre Channel Switching Fabric Services", *Proceedings of the SPIE, SPIE, Bellingham, VA, USA* vol. 1577.. XP000562869, ISSN: 0277-786X,(Sep. 4, 1991),216-226.
Melhem, et al., "Minimizing Wavelength Conversions in WDM Path Establishment", *Computer Science Department, University of Pittsburgh, Pittsburgh, PA 15260*, (2001), 197-211.
Ridgeway, Curt, "0GFC-40GFC using 4-lane XAUI's", *LSI Logic Presentation—T11/03-069v0*.
Clark, Tom, "Zoning for Fibre Channel Fabrics", Vixel Corporation Paper—XP002185194., (Aug. 1999), pp. 1-6.
Malavalli, Kumar, et al., "Distributed Computing with fibre channel fabric", Proc of the Computer Soc. Int'l Conf., Los Alamitos, IEEE Comp Soc. Press., vol. Conf. 37, XP000340745, (Feb. 24, 1992), pp. 269-274.
Martin, Charles R., "Fabric Interconnection of fibre channel standard nodes", Proceedings of the SPIE, (Sep. 8, 1992), pp. 65-71.

Yoshida, Hu, "LUN Security Considerations for Storage Area Networks," Hitachi Data Systems Paper—XP 002185193 (1999), pp. 1-7.

Claudio DeSanti, "Virtual Fabrics Switch Support" ; VF Switch Support, T11/04-395v2. Sep. 2004, pp. 1-15.

Pelissier et al, "Inter-Fabric Routing", dated Jul. 30, 2004, Inter Fabric Routing (04-520v0); pp. 1-31.

DeSanti et al, "Virtual Fabrics"; Virtual Fabrics, T11/03-352v0, May 2003; pp. 1-4.

Martin et al , "Virtual Channel Architecture", presentation by Brocade to T11/03-369V0 dated Jun. 2, 2003.

"Examination Report from the European Patent Office dated Oct. 12, 2007 for European Application No. 05 805 632.6".

"Office Action from USPTO dated Mar. 20, 2008 for U.S. Appl. No. 10/894,732".

International Preliminary Report on Patentability dated Apr. 3, 2007, for International patent application No. PCT/US2005/034844.

International Preliminary Report on Patentability dated Apr. 3, 2007, for International patent application No. PCT/US2005/034758.

International Preliminary Report on Patentability dated Apr. 11, 2007, for International patent application No. PCT/US2005/034845.

International Preliminary Report on Patentability dated Apr. 3, 2007, for International patent application No. PCT/US2005/035064.

International Preliminary Report on Patentability dated Jul. 24, 2007, for International patent application No. PCT/US2005/42528.

"Notice of Allowance from USPTO dated Feb. 8, 2008 for U.S. Appl. No. 10/894,529".

"Office Action from USPTO dated Feb. 12, 2008 for U.S. Appl. No. 11/057,912".

Naik, D. "Inside Windows Storage:Server Storage Technologies for Windows 2000, Windows Server 2003 and Beyond", *Addison-Wesley, US, Chapter 5, XP-002381152*, (Jul. 15, 2003), 137-173.

"Deliver Server-Free Backup", *Pathlight & Computer Associates*, White Paper of Apr. 2000, Ithaca, New York, XP-002381153, 1-8.

"Office Action from USPTO dated Mar. 5, 2008 for U.S. Appl. No. 10/889,259".

"Office Action from USPTO dated Mar. 7, 2008 for U.S. Appl. No. 10/894,629".

"Office Action from USPTO dated Dec. 7, 2007 for U.S. Appl. No. 10/961,463".

"Notice of Allowance from USPTO dated Dec. 21, 2007 for U.S. Appl. No. 10/961,463".

"Notice of Allownace from USPTO dated Dec. 20, 2007 for U.S. Appl. No. 10/889,337".

"Notice of Allowance from USPTO dated Jan. 8, 2008 for U.S. Appl. No. 10/889,551".

"Office Action from USPTO dated Jan. 9, 2008 for U.S. Appl. No. 10/798,468".

"Office Action from USPTO dated Jan. 9, 2008 for U.S. Appl. No. 11/608,634".

"Notice of Allowance from USPTO dated Jan. 11, 2008 for U.S. Appl. No. 10/664,548".

"Notice of Allowance from USPTO dated Jan. 10, 2008 for U.S. Appl. No. 10/263,858".

"Notice of Allowance from USPTO dated Apr. 4, 2008 for U.S. Appl. No. 11/608,634".

"Office Action from USPTO dated Apr. 4, 2008 for U.S. Appl. No. 10/957,465".

"Office Action from USPTO dated Apr. 3, 2008 for U.S. Appl. No. 10/894,587".

"Notice of Allowance from USPTO dated Apr. 10, 2008 for U.S. Appl. No. 10/241,153".

"Office Action from USPTO dated Apr. 14, 2008 for U.S. Appl. No. 10/894,627".

"Office Action from USPTO dated Apr. 17, 2008 for U.S. Appl. No. 10/894,689".

"Notice of Allowance from USPTO dated Apr. 18, 2008 for U.S. Appl. No. 10/894,597".

"Final Office Action from USPTO dated Apr. 23, 2008 for U.S. Appl. No. 10/889,255".

"Final Office Action from USPTO dated Apr. 25, 2008 for U.S. Appl. No. 10/894,579".

"Final Office Action from USPTO dated Apr. 29, 2008 for U.S. Appl. No. 10/894,491".

"Office Action from USPTO dated May 2, 2008 for U.S. Appl. No. 11/037,922".

"Final Office Action from USPTO dated May 12, 2008 for U.S. Appl. No. 10/894,492".

"Office Action from USPTO dated May 14, 2008 for U.S. Appl. No. 10/956,502".

"Office Action from USPTO dated May 15, 2008 for U.S. Appl. No. 10/798,527".

"Final Office Action from USPTO dated May 21, 2008 for U.S. Appl. No. 10/889,635".

"Final Office Action from USPTO dated Jun. 4, 2008 for U.S. Appl. No. 10/894,978".

"Final Office Action from USPTO dated Jun. 5, 2008 for U.S. Appl. No. 10/889,267".

"Final Office Action from USPTO dated Jun. 10, 2008 for U.S. Appl. No. 10/894,586".

"Office Action from USPTO dated Jun. 25, 2008 for U.S. Appl. No. 10/895,175".

"Notice of Allowance from USPTO dated Jun. 25, 2008 for U.S. Appl. No. 10/894,491".

"Notice of Allowance from USPTO dated Jun. 27, 2008 for U.S. Appl. No. 10/956,717".

"Office Action from USPTO dated Jun. 26, 2008 for U.S. Appl. No. 10/894,547".

"Office Action from USPTO dated Jun. 27, 2008 for U.S. Appl. no. 10/894,726".

"Final Office Action from USPTO dated Jul. 9, 2008 for U.S. Appl. No. 10/894,917".

"Notice of Allowance from USPTO dated Jul. 9, 2008 for U.S. Appl. No. 10/894,629".

"Notice of Allowance from USPTO dated Jul. 9, 2008 for U.S. Appl. No. 10/894,579".

"Final Office Action from USPTO dated Apr. 1, 2008 for U.S. Appl. No. 10/956,717".

"Notice of Allowance from USPTO dated Jul. 17, 2008 for U.S. Appl. No. 10/894,536".

"Office Action from USPTO dated Jul. 25, 2008 for U.S. Appl. No. 10/894,827".

"Final Office Action from USPTO Dated Aug. 4, 2008 for U.S. Appl. No. 10/894,732".

"Notice of Allowance from USPTO dated Aug. 18, 2008 for U.S. Appl. No. 10/889,259".

"Office Action from State Intellectual Property Office (SIPO) of China for Chinese application 200580032889.0".

"Final Office Action from USPTO dated Aug. 20, 2008 for U.S. Appl. No. 10/798,468".

"Office Action from USPTO dated Sep. 18, 2008 for U.S. Appl. No. 10/894,978".

* cited by examiner

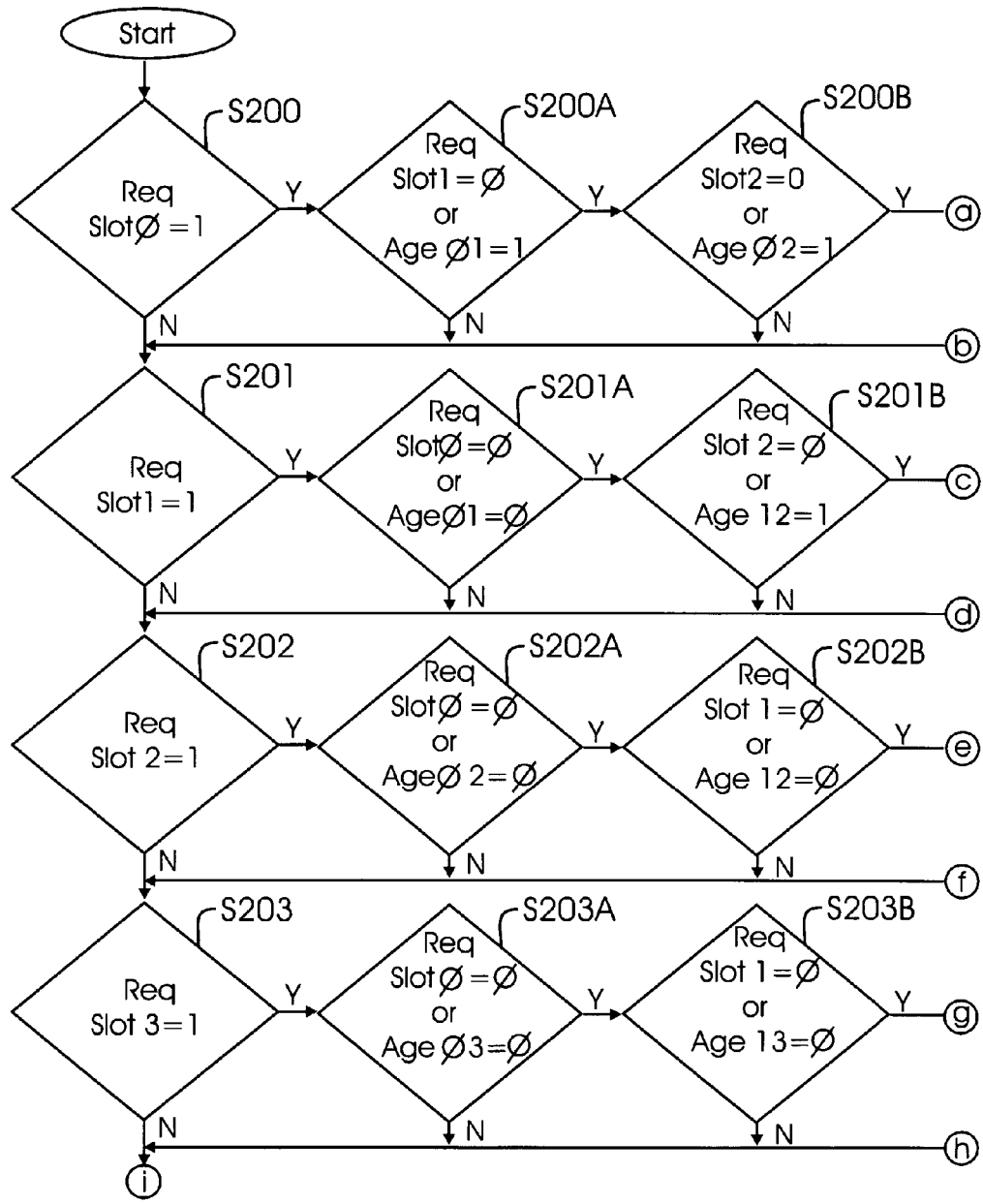
FIGURE 2-i

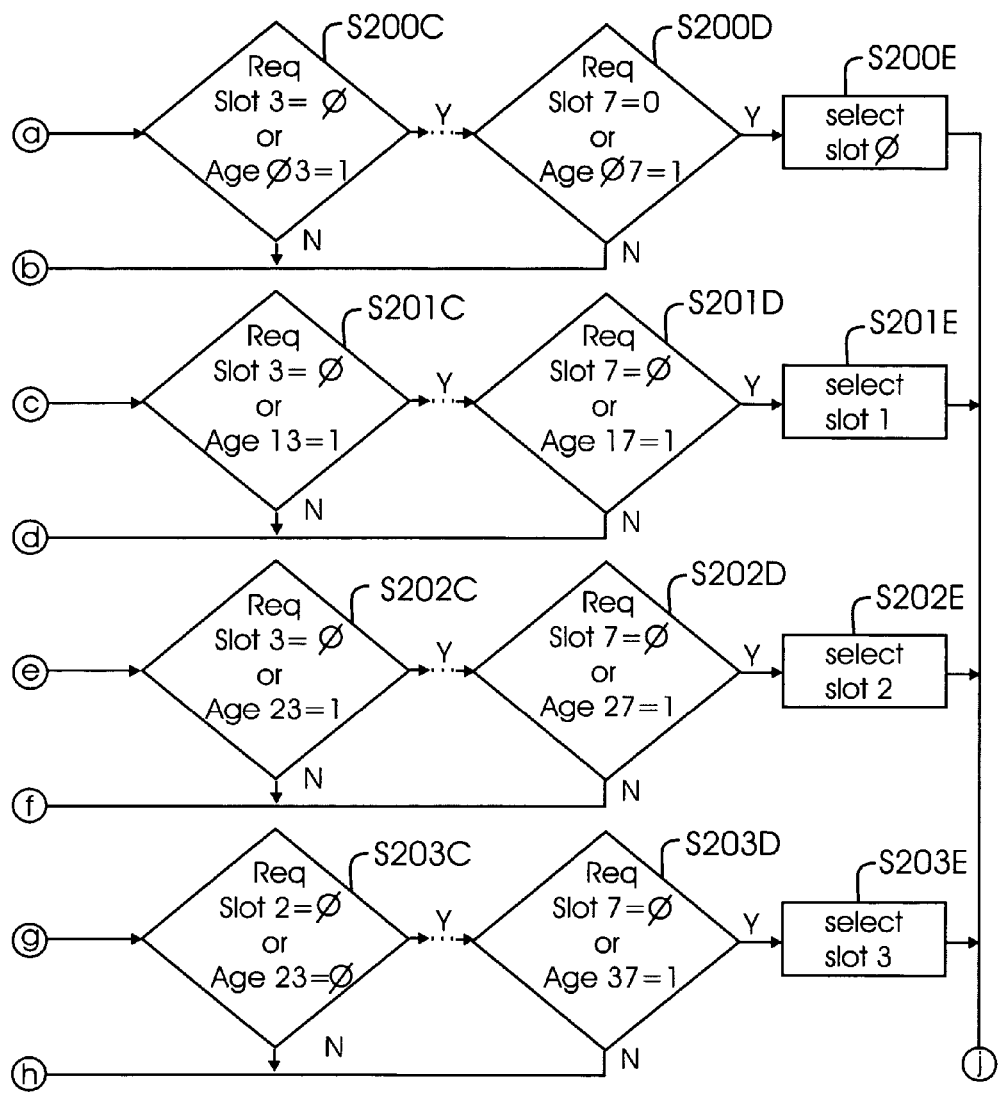
FIGURE 2-ii

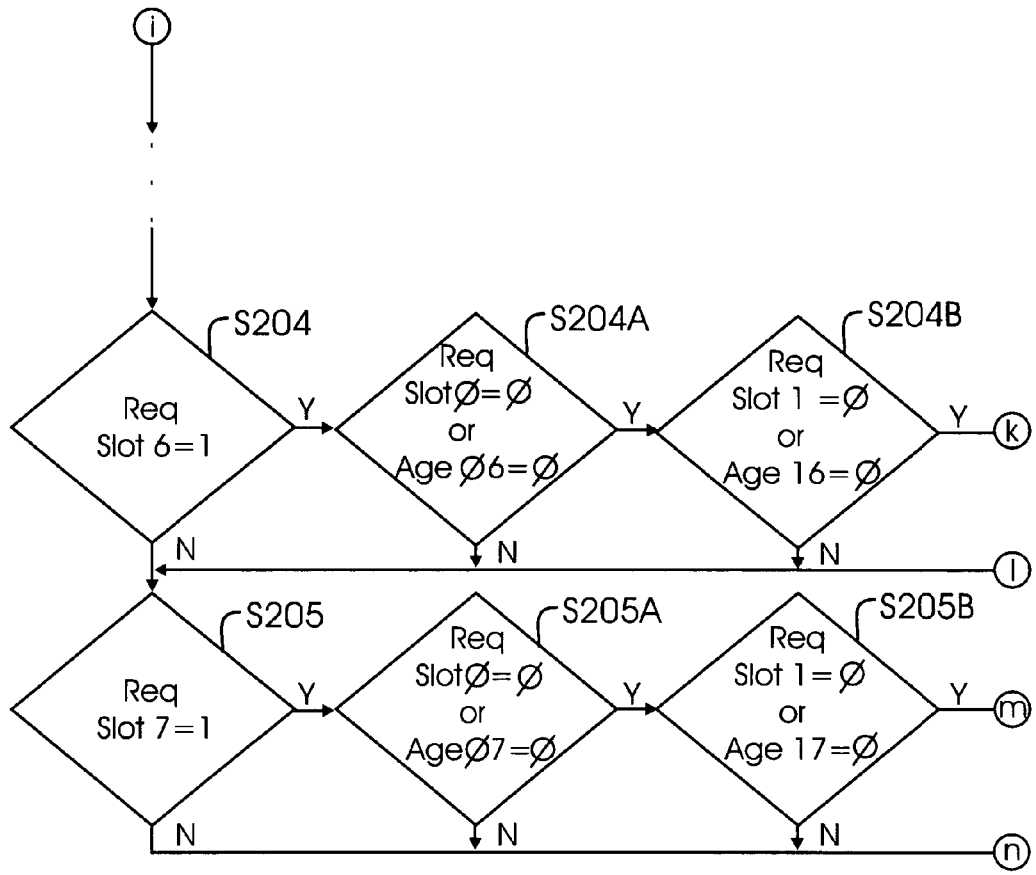
FIGURE 2-iii

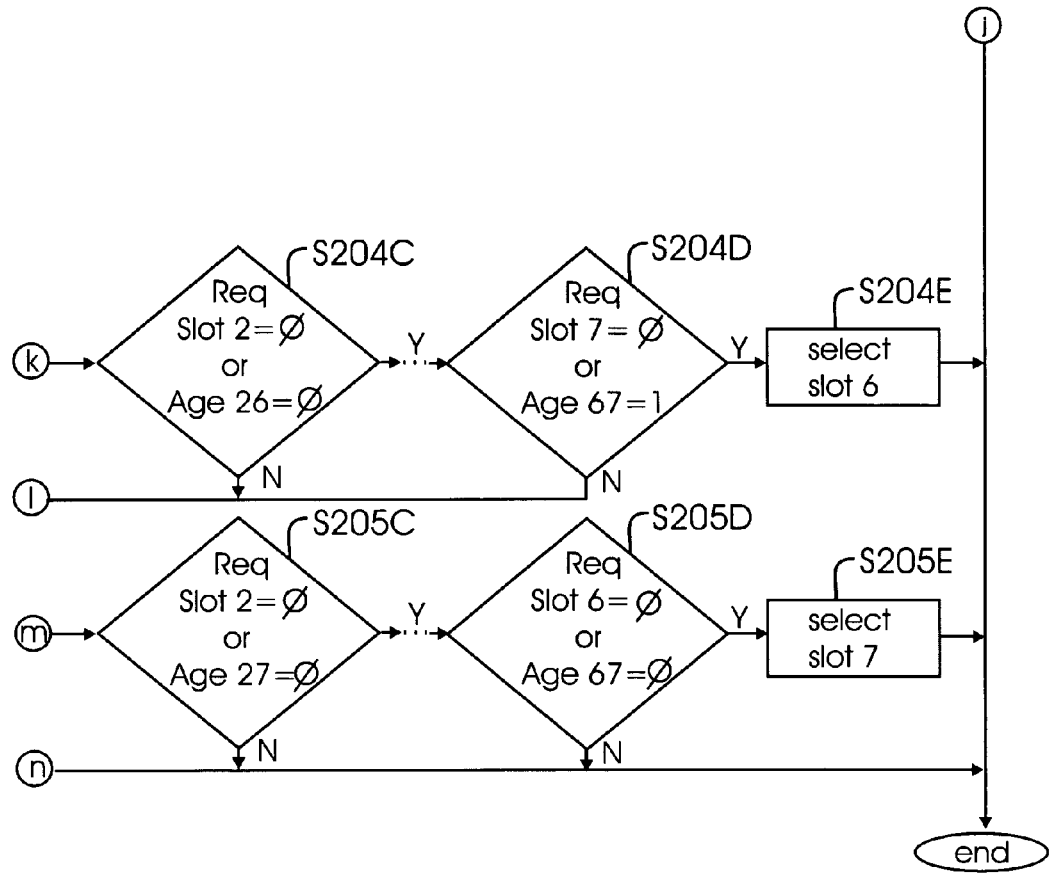
FIGURE 2-iv

History Age01 = 1 if slot 0 is older than slot1
History Age01 = 0 if slot 1 is older than slot0

On Slot Write clear column

|   | 0 | 1 | 2 | 3 | 4 | 5 | 6 | 7 |
|---|---|---|---|---|---|---|---|---|
| 0 | X | X | X | X | X | X | X | X |
| 1 | Age 01 | X | X | X | X | X | X | X |
| 2 | Age 02 | Age 12 | X | X | X | X | X | X |
| 3 | Age 03 | Age 13 | Age 23 | X | X | X | X | X |
| 4 | Age 04 | Age 14 | Age 24 | Age 34 | X | X | X | X |
| 5 | Age 05 | Age 15 | Age 25 | Age 35 | Age 45 | X | X | X |
| 6 | Age 06 | Age 16 | Age 26 | Age 36 | Age 46 | Age 56 | X | X |
| 7 | Age 07 | Age 17 | Age 27 | Age 37 | Age 47 | Age 57 | Age 67 | X |

In Slot Write set row

Age01 = Write Slot(1) +(Age01.!Write Slot(0))
Age02 = Write Slot(2) +(Age02.!Write Slot(0))
Age03 = Write Slot(3) +(Age03.!Write Slot(0))
Age04 = Write Slot(4) +(Age04.!Write Slot(0))
Age05 = Write Slot(5) +(Age05.!Write Slot(0))
Age06 = Write Slot(6) +(Age06.!Write Slot(0))
Age07 = Write Slot(7) +(Age07.!Write Slot(0))
Age12 = Write Slot(2) +(Age12.!Write Slot(1))
Age13 = Write Slot(3) +(Age13.!Write Slot(1))
Age14 = Write Slot(4) +(Age14.!Write Slot(1))
Age15 = Write Slot(5) +(Age15.!Write Slot(1))
Age16 = Write Slot(6) +(Age16.!Write Slot(1))
Age17 = Write Slot(7) +(Age17.!Write Slot(1))
Age23 = Write Slot(3) +(Age23.!Write Slot(2))
Age24 = Write Slot(4) +(Age24.!Write Slot(2))
Age25 = Write Slot(5) +(Age25.!Write Slot(2))
Age26 = Write Slot(6) +(Age26.!Write Slot(2))
Age27 = Write Slot(7) +(Age27.!Write Slot(2))
Age34 = Write Slot(4) +(Age34.!Write Slot(3))
Age35 = Write Slot(5) +(Age35.!Write Slot(3))
Age36 = Write Slot(6) +(Age36.!Write Slot(3))
Age37 = Write Slot(7) +(Age37.!Write Slot(3))
Age45 = Write Slot(5) +(Age45.!Write Slot(4))
Age46 = Write Slot(6) +(Age46.!Write Slot(4))
Age47 = Write Slot(7) +(Age47.!Write Slot(4))
Age56 = Write Slot(6) +(Age06.!Write Slot(5))
Age57 = Write Slot(7) +(Age06.!Write Slot(5))
Age67 = Write Slot(7) +(Age06.!Write Slot(6))

FIGURE 5A-2

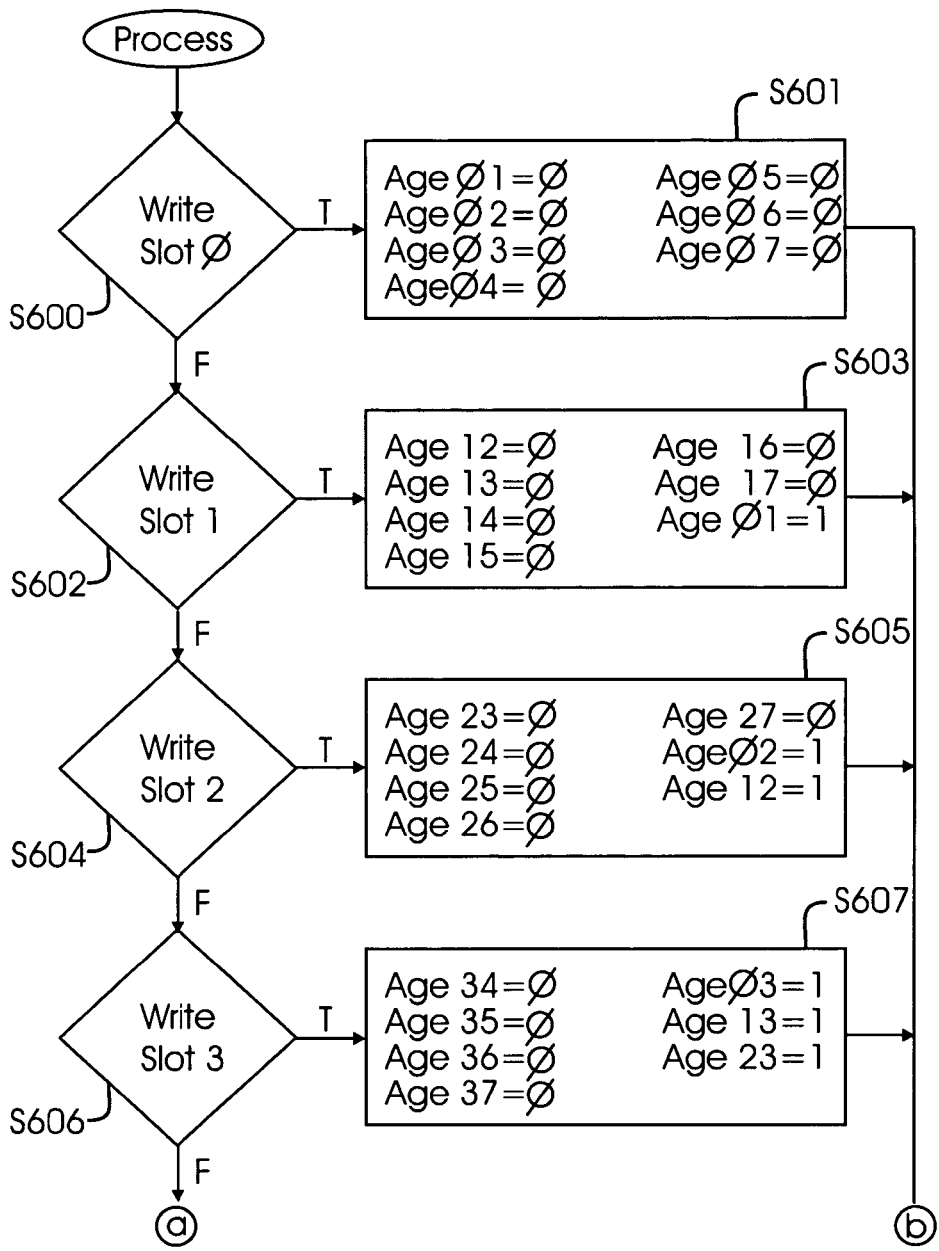
FIGURE 6-i

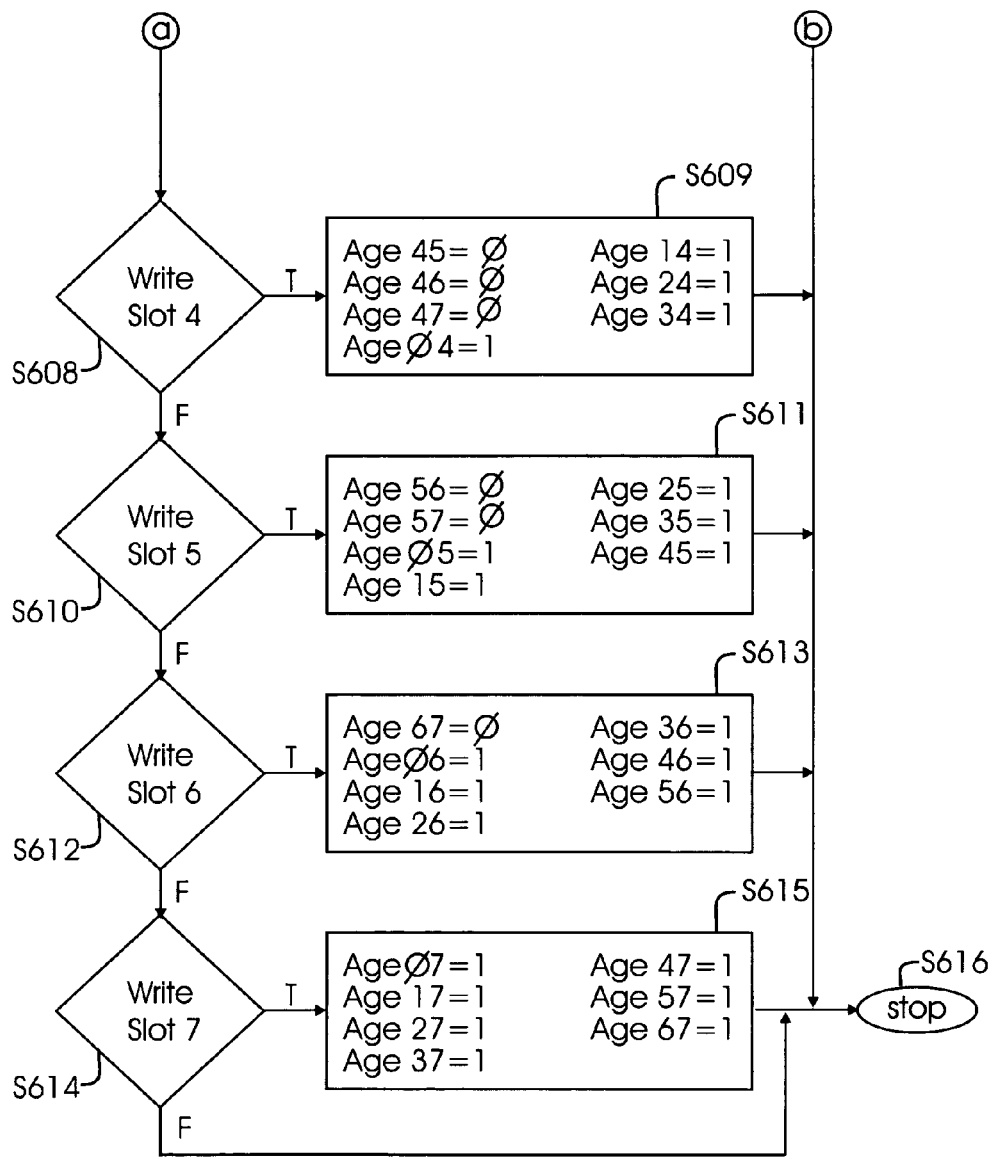
FIGURE 6-ii

METHOD AND SYSTEM FOR REDUCING LATENCY AND CONGESTION IN FIBRE CHANNEL SWITCHES

CROSS REFERENCE TO RELATED APPLICATIONS

This application claims priority under 35 U.S.C. § 119(e)(1) to the following provisional patent applications:

Filed on Sep. 19, 2003, Ser. No. 60/503,812, entitled "Method and System for Fibre Channel Switches";

Filed on Jan. 21, 2004, Ser. No. 60/537,933 entitled "Method And System For Routing And Filtering Network Data Packets In Fibre Channel Systems";

Filed on Jul. 21, 2003, Ser. No. 60/488,757, entitled "Method and System for Selecting Virtual Lanes in Fibre Channel Switches";

Filed on Dec. 29, 2003, Ser. No. 60/532,965, entitled "Programmable Pseudo Virtual Lanes for Fibre Channel Systems";

Filed on Sep. 19, 2003, Ser. No. 60/504,038, entitled" Method and System for Reducing Latency and Congestion in Fibre Channel Switches;

Filed on Aug. 14, 2003, Ser. No. 60/495,212, entitled "Method and System for Detecting Congestion and Over Subscription in a Fibre channel Network"

Filed on Aug. 14, 2003, Ser. No. 60/495,165, entitled "LUN Based Hard Zoning in Fibre Channel Switches";

Filed on Sep. 19, 2003, Ser. No. 60/503,809, entitled "Multi Speed Cut Through Operation in Fibre Channel Switches"

Filed on Sep. 23, 2003, Ser. No. 60/505,381, entitled "Method and System for Improving bandwidth and reducing Idles in Fibre Channel Switches";

Filed on Sep. 23, 2003, Ser. No. 60/505,195, entitled "Method and System for Keeping a Fibre Channel Arbitrated Loop Open During Frame Gaps";

Filed on Mar. 30, 2004, Ser. No. 60/557,613, entitled "Method and System for Congestion Control based on Optimum Bandwidth Allocation in a Fibre Channel Switch";

Filed on Sep. 23, 2003, Ser. No. 60/505,075, entitled "Method and System for Programmable Data Dependent Network Routing";

Filed on Sep. 19, 2003, Ser. No. 60/504,950, entitled "Method and System for Power Control of Fibre Channel Switches";

Filed on Dec. 29, 2003, Ser. No. 60/532,967, entitled "Method and System for Buffer to Buffer Credit recovery in Fibre Channel Systems Using Virtual and/or Pseudo Virtual Lane"

Filed on Dec. 29, 2003, Ser. No. 60/532,966, entitled "Method And System For Using Extended Fabric Features With Fibre Channel Switch Elements"

Filed on Mar. 4, 2004, Ser. No. 60/550,250, entitled "Method And System for Programmable Data Dependent Network Routing"

Filed on May 7, 2004, Ser. No. 60/569,436, entitled "Method And System For Congestion Control In A Fibre Channel Switch"

Filed on May 18, 2004, Ser. No. 60/572,197, entitled "Method and System for Configuring Fibre Channel Ports" and Filed on Dec. 29, 2003, Ser. No. 60/532,963 entitled "Method and System for Managing Traffic in Fibre Channel Switches".

The disclosure of the foregoing applications is incorporated herein by reference in their entirety.

BACKGROUND

1. Field of the Invention

The present invention relates to fibre channel systems, and more particularly, to reducing latency in fibre channel switches.

2. Background of the Invention

Fibre channel is a set of American National Standard Institute (ANSI) standards, which provide a serial transmission protocol for storage and network protocols such as HIPPI, SCSI, IP, ATM and others. Fibre channel provides an input/output interface to meet the requirements of both channel and network users.

Fibre channel supports three different topologies: point-to-point, arbitrated loop and fibre channel fabric. The point-to-point topology attaches two devices directly. The arbitrated loop topology attaches devices in a loop. The fibre channel fabric topology attaches host systems directly to a fabric, which are then connected to multiple devices. The fibre channel fabric topology allows several media types to be interconnected.

Fibre channel is a closed system that relies on multiple ports to exchange information on attributes and characteristics to determine if the ports can operate together. If the ports can work together, they define the criteria under which they communicate.

In fibre channel, a path is established between two nodes where the path's primary task is to transport data from one point to another at high speed with low latency, performing only simple error detection in hardware.

Fibre channel fabric devices include a node port or "N_Port" that manages fabric connections. The N_port establishes a connection to a fabric element (e.g., a switch) having a fabric port or F_port. Fabric elements include the intelligence to handle routing, error detection, recovery, and similar management functions.

A fibre channel switch is a multi-port device where each port manages a simple point-to-point connection between itself and its attached system. Each port can be attached to a server, peripheral, I/O subsystem, bridge, hub, router, or even another switch. A switch receives messages from one port and automatically routes it to another port. Multiple calls or data transfers happen concurrently through the multi-port fibre channel switch.

Fibre channel switches use memory buffers to hold frames received and sent across a network. Associated with these buffers are credits, which are the number of frames that a buffer can hold per fabric port.

As the bandwidth demand increases on fibre channel networks, it is important that frames from a receive buffer are delivered with minimal latency under loaded conditions. Conventional switches do not offer an age based system for moving network data packets from a receive buffer and hence are not very efficient.

Therefore, what is required is a process and system that can establish age based network data packet buffer priority scheme and reduce congestion.

SUMMARY OF THE PRESENT INVENTION

A method for routing fibre channel frames using a fibre channel switch element is provided, in one aspect of the present invention. The method includes, determining a relative age of a first memory slot with respect to at least another memory slot; and transmitting a frame from a memory slot based on the relative age. The method also includes, sending frames that have resided in a memory slot for a greater period compared to frames residing in at least another memory slot; and setting age bits in plural memory slots when frames are written and the relative age is determined based on the age bits. An aging table may be used to store the age bits of the plural memory slots.

In another aspect of the present invention, a fibre channel switch element for routing fibre channel frames is provided. The switch element includes means for determining a relative age of a first memory slot with respect to at least another memory slot; and means for transmitting a frame from a memory slot based on the relative age.

In yet another aspect of the present invention, a fibre channel switch element for routing fibre channel frames is provided. The switch element includes, a port with a buffer having more than one memory slot for receiving fibre channel frames, wherein the port tracks a relative age of a first memory slot with respect to at least another memory slot; and frames are transmitted from a memory slot based on the relative age.

In one aspect of the present invention, an age based network data packet buffer priority scheme is provided that reduces frame latency and congestion.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures:

FIGS. 5A-1/5A-2 (jointly referred to as FIG. 5A) show an example of an age based table, used according to one aspect of the present invention;

FIGS. 6-i/6-ii (jointly referred to as FIG. 6) show a flow diagram of executable steps for routing frames based on an aging process, according to one aspect of the present invention.

DETAILED DESCRIPTION OF THE PREFERRED EMBODIMENTS

Definitions:

The following definitions are provided as they are typically (but not exclusively) used in the fibre channel environment, implementing the various adaptive aspects of the present invention.

"E-Port": A fabric expansion port that attaches to another Interconnect port to create an Inter-Switch Link.

"F_Port": A port to which non-loop N_Ports are attached to a fabric and does not include FL_ports.

"Fibre channel ANSI Standard": The standard describes the physical interface, transmission and signaling protocol of a high performance serial link for support of other high level protocols associated with IPI, SCSI, IP, ATM and others.

"FC-1": Fibre channel transmission protocol, which includes serial encoding, decoding and error control.

"FC-2": Fibre channel signaling protocol that includes frame structure and byte sequences.

"FC-3": Defines a set of fibre channel services that are common across plural ports of a node.

"FC-4": Provides mapping between lower levels of fibre channel, IPI and SCSI command sets, HIPPI data framing, IP and other upper level protocols.

"Fabric": The structure or organization of a group of switches, target and host devices (NL_Port, N_ports etc.).

"Fabric Topology": This is a topology where a device is directly attached to a fibre channel fabric that uses destination identifiers embedded in frame headers to route frames through a fibre channel fabric to a desired destination.

"FL_Port": A L_Port that is able to perform the function of a F_Port, attached via a link to one or more NL_Ports in an Arbitrated Loop topology.

"Inter-Switch Link": A Link directly connecting the E_port of one switch to the E_port of another switch.

Port: A general reference to N. Sub.-- Port or F.Sub.--Port.

"L_Port": A port that contains Arbitrated Loop functions associated with the Arbitrated Loop topology.

"N-Port": A direct fabric attached port.

"NL_Port": A L_Port that can perform the function of a N_Port.

"Switch": A fabric element conforming to the Fibre Channel Switch standards.

Fibre Channel System:

To facilitate an understanding of the preferred embodiment, the general architecture and operation of a fibre channel system will be described. The specific architecture and operation of the preferred embodiment will then be described with reference to the general architecture of the fibre channel system.

Figure 1A:
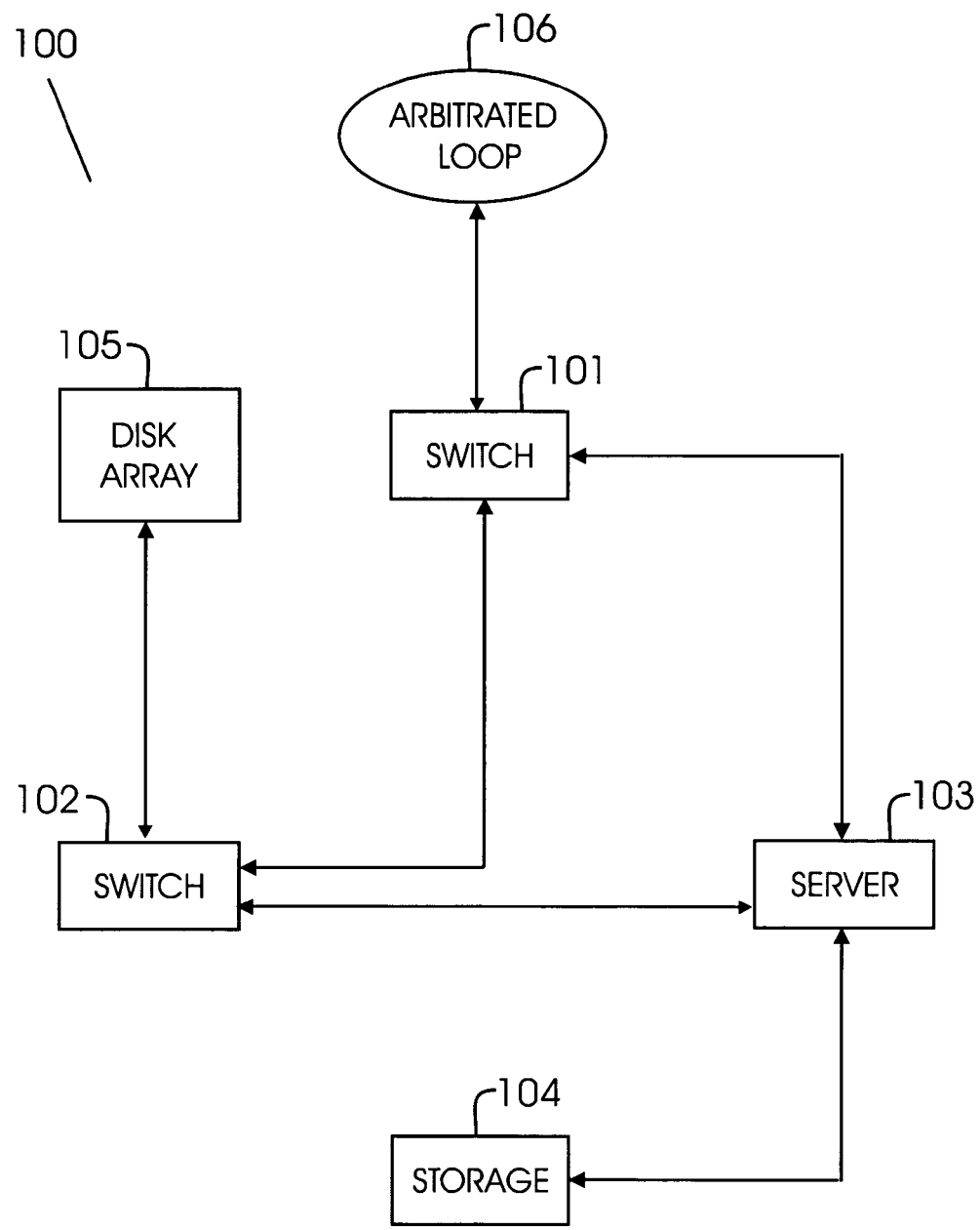
FIG. 1A shows an example of a Fibre Channel network system.

FIG. 1A is a block diagram of a fibre channel system 100 implementing the methods and systems in accordance with the adaptive aspects of the present invention. System 100 includes plural devices that are interconnected. Each device includes one or more ports, classified as node ports (N_Ports), fabric ports (F_Ports), and expansion ports (E_Ports). Node ports may be located in a node device, e.g. server 103, disk array 105 and storage device 104. Fabric ports are located in fabric devices such as switch 101 and 102. Arbitrated loop 106 may be operationally coupled to switch 101 using arbitrated loop ports (FL_Ports).

The devices of FIG. 1A are operationally coupled via "links" or "paths". A path may be established between two N_ports, e.g. between server 103 and storage 104. A packet-switched path may be established using multiple links, e.g. an N-Port in server 103 may establish a path with disk array 105 through switch 102.

Fabric Switch Element

Figure 1B:
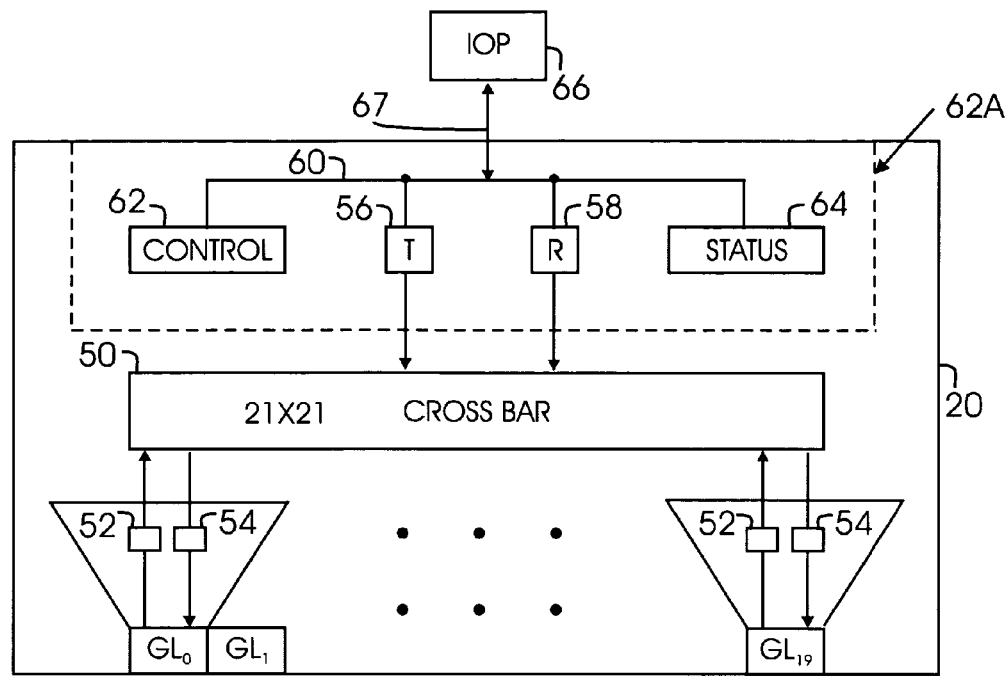
FIG. 1B shows an example of a Fibre Channel switch element, according to one aspect of the present invention.

FIG. 1B is a block diagram of a 20-port ASIC fabric element according to one aspect of the present invention. FIG. 1B provides the general architecture of a 20-channel switch chassis using the 20-port fabric element. Fabric element includes ASIC 20 with non-blocking fibre channel class 2 (connectionless, acknowledged) and class 3 (connectionless, unacknowledged) service between any ports. It is noteworthy that ASIC 20 may also be designed for class 1 (connection-oriented) service, within the scope and operation of the present invention as described herein.

The fabric element of the present invention is presently implemented as a single CMOS ASIC, and for this reason the term "fabric element" and ASIC are used interchangeably to refer to the preferred embodiments in this specification. Although FIG. 1B shows 20 ports, the present invention is not limited to any particular number of ports.

ASIC 20 has 20 ports numbered in FIG. 1B as GL0 through GL19. These ports are generic to common Fibre Channel port types, for example, F_Port, FL_Port and E-Port. In other words, depending upon what it is attached to, each GL port can function as any type of port. Also, the GL port may function as a special port useful in fabric element linking, as described below.

For illustration purposes only, all GL ports are drawn on the same side of ASIC 20 in FIG. 1B. However, the ports may be located on both sides of ASIC 20 as shown in other figures. This does not imply any difference in port or ASIC design. Actual physical layout of the ports will depend on the physical layout of the ASIC.

Each port GL0-GL19 has transmit and receive connections to switch crossbar 50. One connection is through receive buffer 52, which functions to receive and temporarily hold a frame during a routing operation. The other connection is through a transmit buffer 54.

Switch crossbar 50 includes a number of switch crossbars for handling specific types of data and data flow control information. For illustration purposes only, switch crossbar 50 is shown as a single crossbar. Switch crossbar 50 is a connectionless crossbar (packet switch) of known conventional design, sized to connect 21×21 paths. This is to accommodate 20 GL ports plus a port for connection to a fabric controller, which may be external to ASIC 20.

Figure 1C:
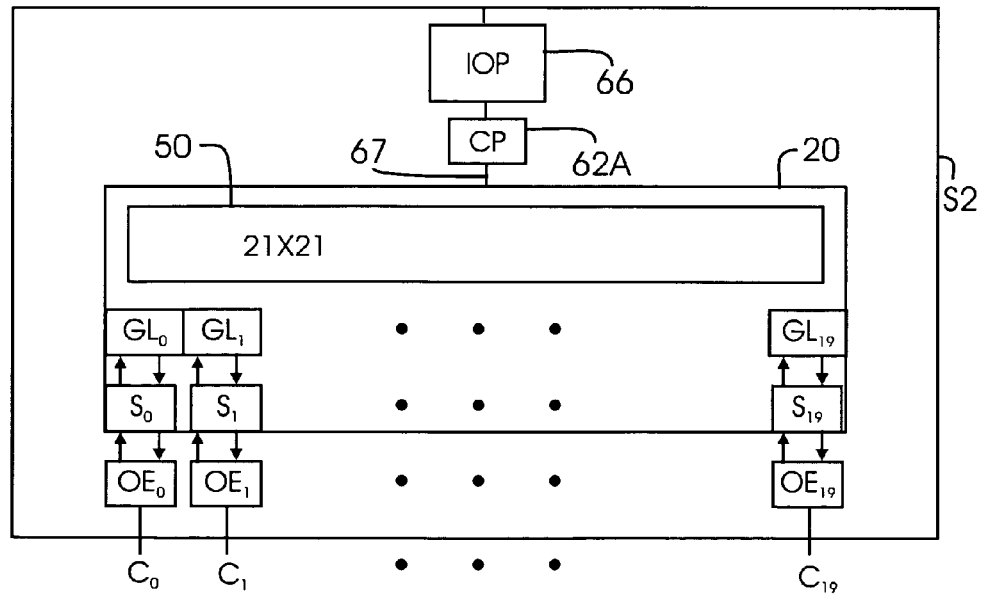
FIG. 1C shows a block diagram of a 20-channel switch chassis, according to one aspect of the present invention.

In the preferred embodiments of switch chassis described herein, the fabric controller is a firmware-programmed microprocessor, also referred to as the input/out processor ("IOP"). IOP 66 is shown in FIG. 1C as a part of a switch chassis utilizing one or more of ASIC 20. As seen in FIG. 1B, bi-directional connection to IOP 66 is routed through port 67, which connects internally to a control bus 60. Transmit buffer 56, receive buffer 58, control register 62 and Status register 64 connect to bus 60. Transmit buffer 56 and receive buffer 58 connect the internal connectionless switch crossbar 50 to IOP 66 so that it can source or sink frames.

Control register 62 receives and holds control information from IOP 66, so that IOP 66 can change characteristics or operating configuration of ASIC 20 by placing certain control words in register 62. IOP 66 can read status of ASIC 20 by monitoring various codes that are placed in status register 64 by monitoring circuits (not shown).

FIG. 1C shows a 20-channel switch chassis S2 using ASIC 20 and IOP 66. S2 will also include other elements, for example, a power supply (not shown). The 20 GL ports correspond to channel C0-C19. Each GL port has a serial/deserializer (SERDES) designated as S0-S19. Ideally, the SERDES functions are implemented on ASIC 20 for efficiency, but may alternatively be external to each GL port.

Each GL port has an optical-electric converter, designated as OE0-OE19 connected with its SERDES through serial lines, for providing fibre optic input/output connections, as is well known in the high performance switch design. The converters connect to switch channels C0-C19. It is noteworthy that the ports can connect through copper paths or other means instead of optical-electric converters.

Figure 1D:
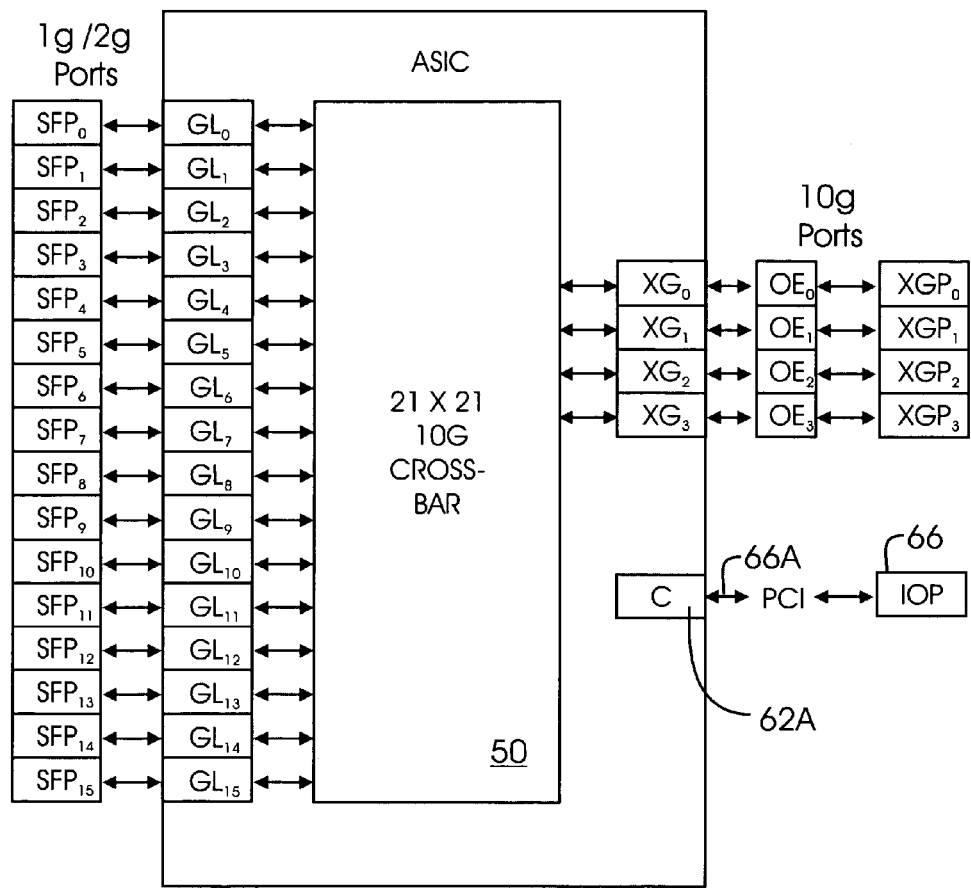
FIG. 1D shows a block diagram of a Fibre Channel switch element with sixteen GL_Ports and four 10G ports, according to one aspect of the present invention.

FIG. 1D shows a block diagram of ASIC 20 with sixteen GL ports and four 10G (Gigabyte) port control modules designated as XG0-XG3 for four 10G ports designated as XGP0-XGP3. ASIC 20 include a control port 62A that is coupled to IOP 66 through a PCI connection 66A.

Figures 1, 1E:
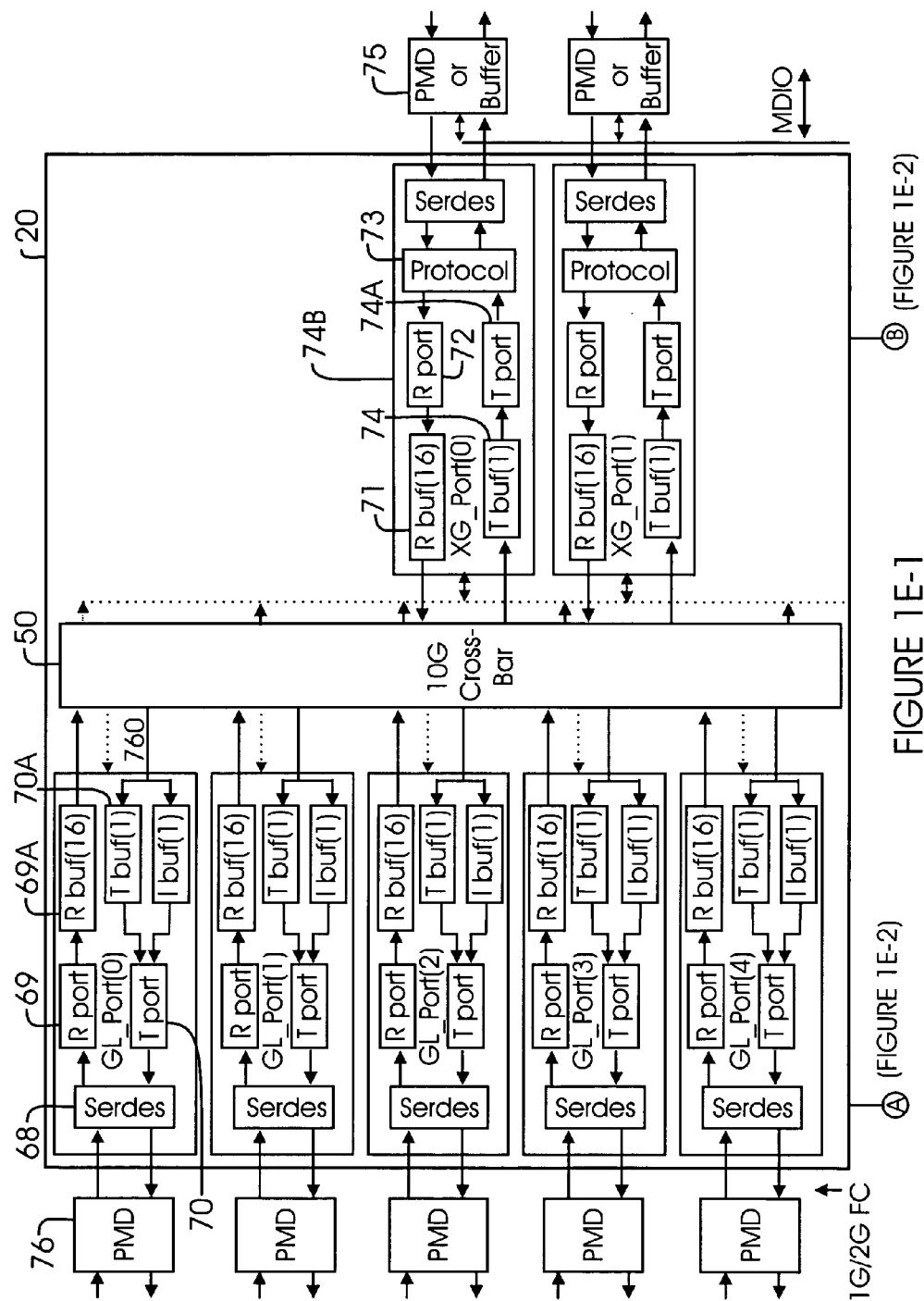
FIGS. 1E-1/1E-2 (jointly referred to as FIG. 1E) show another block diagram of a Fibre Channel switch element with sixteen GL_Ports and four 10G ports, according to one aspect of the present invention.

FIG. 1E-1/1E-2 (jointly referred to as FIG. 1E) show yet another block diagram of ASIC 20 with sixteen GL and four XG port control modules. Each GL port control module has a Receive port (RPORT) 69 with a receive buffer (RBUF) 69A and a transmit port 70 with a transmit buffer (TBUF) 70A, as described below in detail. GL and XG port control modules are coupled to physical media devices ("PMD") 76 and 75 respectively.

Control port module 62A includes control buffers 62B and 62D for transmit and receive sides, respectively. Module 62A also includes a PCI interface module 62C that allows interface with IOP 66 via a PCI bus 66A.

XG_Port (for example 74B) includes RPORT 72 with RBUF 71 similar to RPORT 69 and RBUF 69A and a TBUF and TPORT similar to TBUF 70A and TPORT 70. Protocol module 73 interfaces with SERDES to handle protocol based functionality.

Figure 3A:
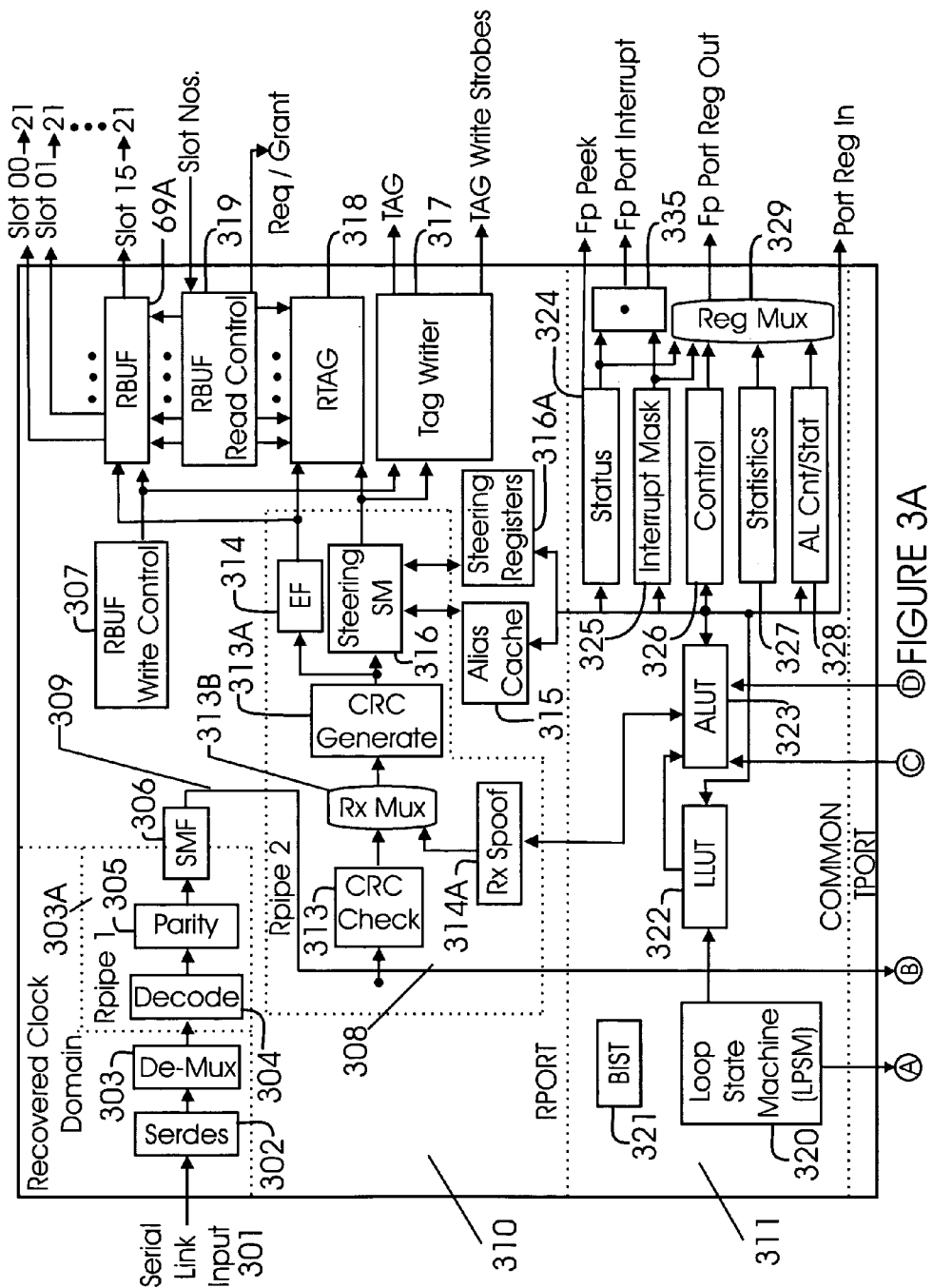
FIGS. 3A/3B (jointly referred to as FIG. 3) show a block diagram of a GL_Port, according to one aspect of the present invention.
Figure 3B:
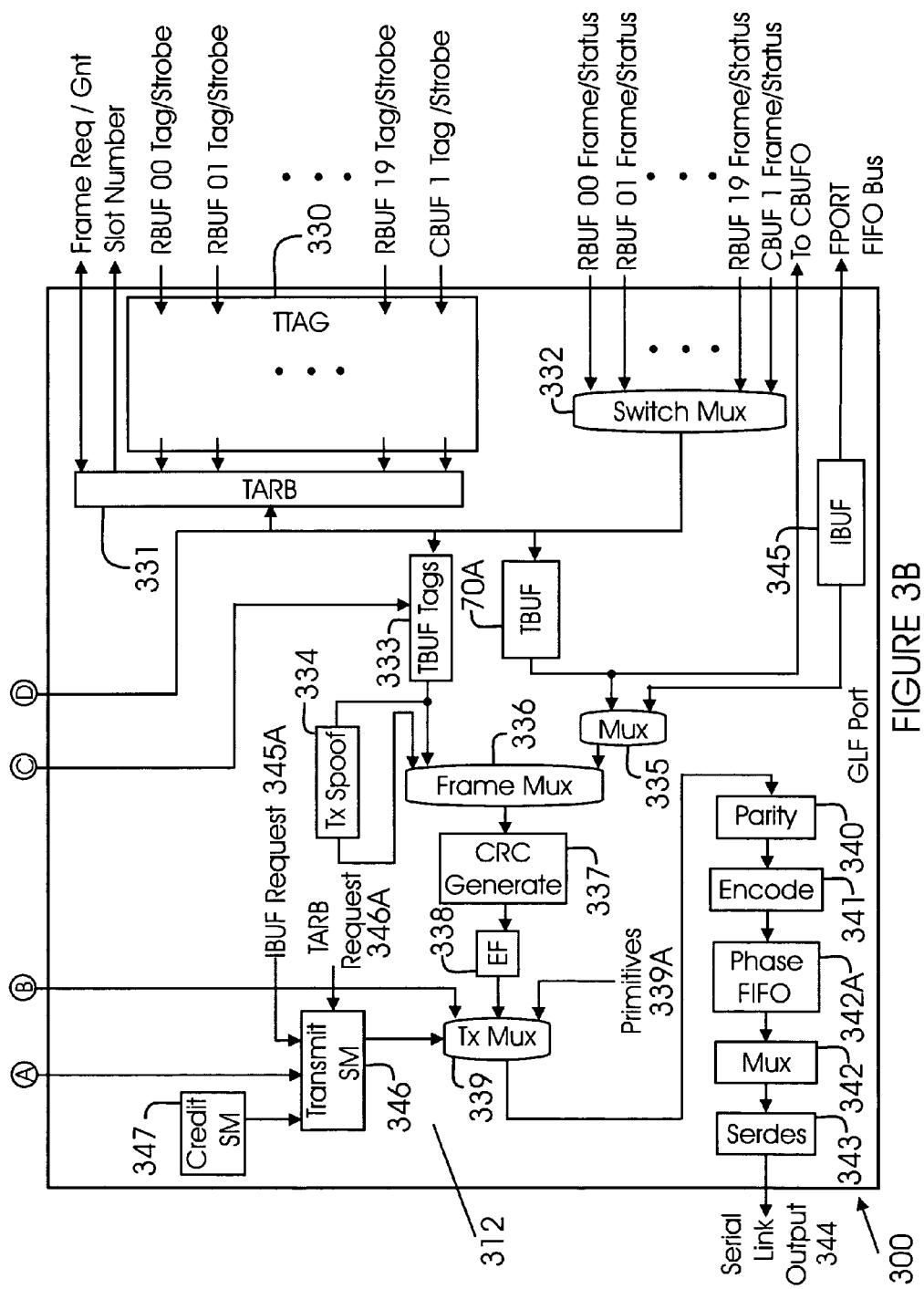

GL_Port:

FIGS. 3A-3B (referred to as FIG. 3) show a detailed block diagram of a GL port as used in ASIC 20. GL port 300 is shown in three segments, namely, receive segment (RPORT) 310, transmit segment (TPORT) 312 and common segment 311.

Receive Segment of GL_Port:

Frames enter through link 301 and SERDES 302 converts data into 10-bit parallel data to fibre channel characters, which are then sent to receive pipe ("Rpipe" may also be referred to as "Rpipe1" or "Rpipe2") 303A via a de-multiplexer (DEMUX) 303. Rpipe 303A includes, parity module 305 and decoder 304. Decoder 304 decodes 10B data to 8B and parity module 305 adds a parity bit. Rpipe 303A also performs various Fibre Channel standard functions such as detecting a start of frame (SOF), end-of frame (EOF), Idles, R_RDYs (fibre channel standard primitive) and the like, which are not described since they are standard functions.

Rpipe 303A connects to smoothing FIFO (SMF) module 306 that performs smoothing functions to accommodate clock frequency variations between remote transmitting and local receiving devices.

Frames received by RPORT 310 are stored in receive buffer (RBUF) 69A, (except for certain Fibre Channel Arbitrated Loop (AL) frames). Path 309 shows the frame entry path, and all frames entering path 309 are written to RBUF 69A as opposed to the AL path 308.

Cyclic redundancy code (CRC) module 313 further processes frames that enter GL port 300 by checking CRC and processing errors according to FC_PH rules. The frames are subsequently passed to RBUF 69A where they are steered to an appropriate output link. RBUF 69A is a link receive buffer and can hold multiple frames.

Reading from and writing to RBUF 69A are controlled by RBUF read control logic ("RRD") 319 and RBUF write control logic ("RWT") 307, respectively. RWT 307 specifies which empty RBUF 69A slot will be written into when a frame arrives through the data link via multiplexer ("Mux") 313B, CRC generate module 313A and EF (external proprietary format) module 314. EF module 314 encodes proprietary (i.e. non-standard) format frames to standard Fibre Channel 8B codes. Mux 313B receives input from Rx Spoof module 314A, which encodes frames to a proprietary format (if enabled). RWT 307 controls RBUF 69A write addresses and provide the slot number to tag writer ("TWT") 317.

RRD 319 processes frame transfer requests from RBUF 69A. Frames may be read out in any order and multiple destinations may get copies of the frames.

Steering state machine (SSM) 316 receives frames and determines the destination for forwarding the frame. SSM 316 produces a destination mask, where there is one bit for each destination. Any bit set to a certain value, for example, 1, specifies a legal destination, and there can be multiple bits set, if there are multiple destinations for the same frame (multicast or broadcast).

SSM 316 makes this determination using information from alias cache 315, steering registers 316A, control register 326 values and frame contents. IOP 66 writes all tables so that correct exit path is selected for the intended destination port addresses.

The destination mask from SSM 316 is sent to TWT 317 and a RBUF tag register (RTAG) 318. TWT 317 writes tags to all destinations specified in the destination mask from SSM 316. Each tag identifies its corresponding frame by containing an RBUF 69A slot number where the frame resides, and an indication that the tag is valid.

Each slot in RBUF 69A has an associated set of tags, which are used to control the availability of the slot. The primary tags are a copy of the destination mask generated by SSM 316. As each destination receives a copy of the frame, the destination mask in RTAG 318 is cleared. When all the mask bits are cleared, it indicates that all destinations have received a copy of the frame and that the corresponding frame slot in RBUF 69A is empty and available for a new frame.

RTAG 318 also has frame content information that is passed to a requesting destination to pre-condition the destination for the frame transfer. These tags are transferred to the destination via a read multiplexer (RMUX) (not shown).

Transmit Segment of GL_Port:

Transmit segment ("TPORT") 312 performs various transmit functions. Transmit tag register (TTAG) 330 provides a list of all frames that are to be transmitted. Tag Writer 317 or common segment 311 write TTAG 330 information. The frames are provided to arbitration module ("transmit arbiter" ("TARB")) 331, which is then free to choose which source to process and which frame from that source to be processed next.

TTAG 330 includes a collection of buffers (for example, buffers based on a first-in first out ("FIFO") scheme) for each frame source. TTAG 330 writes a tag for a source and TARB 331 then reads the tag. For any given source, there are as many entries in TTAG 330 as there are credits in RBUF 69A.

TARB 331 is activated anytime there are one or more valid frame tags in TTAG 330. TARB 331 preconditions its controls for a frame and then waits for the frame to be written into TBUF 70A. After the transfer is complete, TARB 331 may request another frame from the same source or choose to service another source.

TBUF 70A is the path to the link transmitter. Typically, frames don't land in TBUF 70A in their entirety. Mostly, frames simply pass through TBUF 70A to reach output pins, if there is a clear path.

Switch Mux 332 is also provided to receive output from crossbar 50. Switch Mux 332 receives input from plural RBUFs (shown as RBUF 00 to RBUF 19), and input from CPORT 62A shown as CBUF 1 frame/status. TARB 331 determines the frame source that is selected and the selected source provides the appropriate slot number. The output from Switch Mux 332 is sent to ALUT 323 for S_ID spoofing and the result is fed into TBUF Tags 333.

TMUX ("TxMUX") 339 chooses which data path to connect to the transmitter. The sources are: primitive sequences specified by IOP 66 via control registers 326 (shown as primitive 339A), and signals as specified by Transmit state machine ("TSM") 346, frames following the loop path, or steered frames exiting the fabric via TBUF 70A.

TSM 346 chooses the data to be sent to the link transmitter, and enforces all fibre Channel rules for transmission. TSM 346 receives requests to transmit from loop state machine 320, TBUF 70A (shown as TARB request 346A) and from various other IOP 66 functions via control registers 326 (shown as IBUF Request 345A). TSM 346 also handles all credit management functions, so that Fibre Channel connectionless frames are transmitted only when there is link credit to do so.

Loop state machine ("LPSM") 320 controls transmit and receive functions when GL_Port is in a loop mode. LPSM 320 operates to support loop functions as specified by FC-AL-2.

IOP buffer ("IBUF") 345 provides IOP 66 the means for transmitting frames for special purposes.

Frame multiplexer ("Frame Mux" or "Mux") 336 chooses the frame source, while logic (TX spoof 334) converts D_ID and S_ID from public to private addresses. Mux 336 receives input from Tx Spoof module 334, TBUF tags 333, and Mux 335 to select a frame source for transmission.

EF (external proprietary format) module 338 encodes proprietary (i.e. non-standard) format frames to standard Fibre Channel 8B codes and CRC module 337 generates CRC data for the outgoing frames.

Modules 340-343 put a selected transmission source into proper format for transmission on an output link 344. Parity 340 checks for parity errors, when frames are encoded from 8B to 10B by encoder 341, marking frames "invalid", according to Fibre Channel rules, if there was a parity error. Phase FIFO 342A receives frames from encode module 341 and the frame is selected by Mux 342 and passed to SERDES 343. SERDES 343 converts parallel transmission data to serial before passing the data to the link media. SERDES 343 may be internal or external to ASIC 20.

Common Segment of GL_Port:

As discussed above, ASIC 20 include common segment 311 comprising of various modules. LPSM 320 has been described above and controls the general behavior of TPORT 312 and RPORT 310.

A loop look up table ("LLUT") 322 and an address look up table ("ALUT") 323 is used for private loop proxy addressing and hard zoning managed by firmware.

Common segment 311 also includes control register 326 that controls bits associated with a GL_Port, status register 324 that contains status bits that can be used to trigger interrupts, and interrupt mask register 325 that contains masks to determine the status bits that will generate an interrupt to IOP

66. Common segment 311 also includes AL control and status register 328 and statistics register 327 that provide accounting information for FC management information base ("MIB").

Output from status register 324 may be used to generate a Fp Peek function. This allows a status register 324 bit to be viewed and sent to the CPORT.

Output from control register 326, statistics register 327 and register 328 (as well as 328A for an X_Port, shown in FIG. 4) is sent to Mux 329 that generates an output signal (FP Port Reg Out).

Output from Interrupt register 325 and status register 324 is sent to logic 335 to generate a port interrupt signal (FP Port Interrupt).

BIST module 321 is used for conducting embedded memory testing.

XG_Port

Figure 4A:
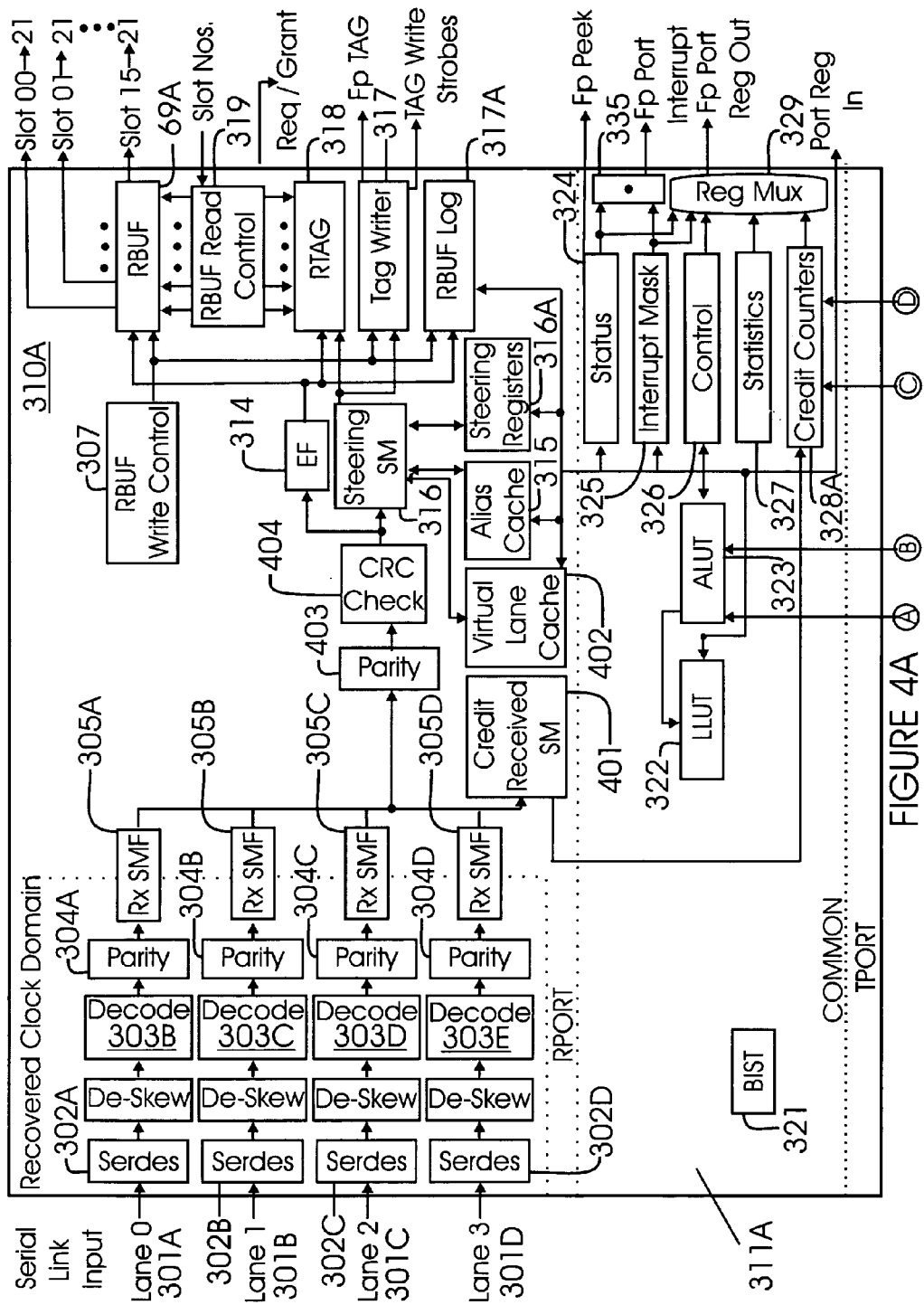
FIGS. 4A/4B (jointly referred to as FIG. 3) show a block diagram of XG_Port (10G) port, according to one aspect of the present invention.
Figure 4B:
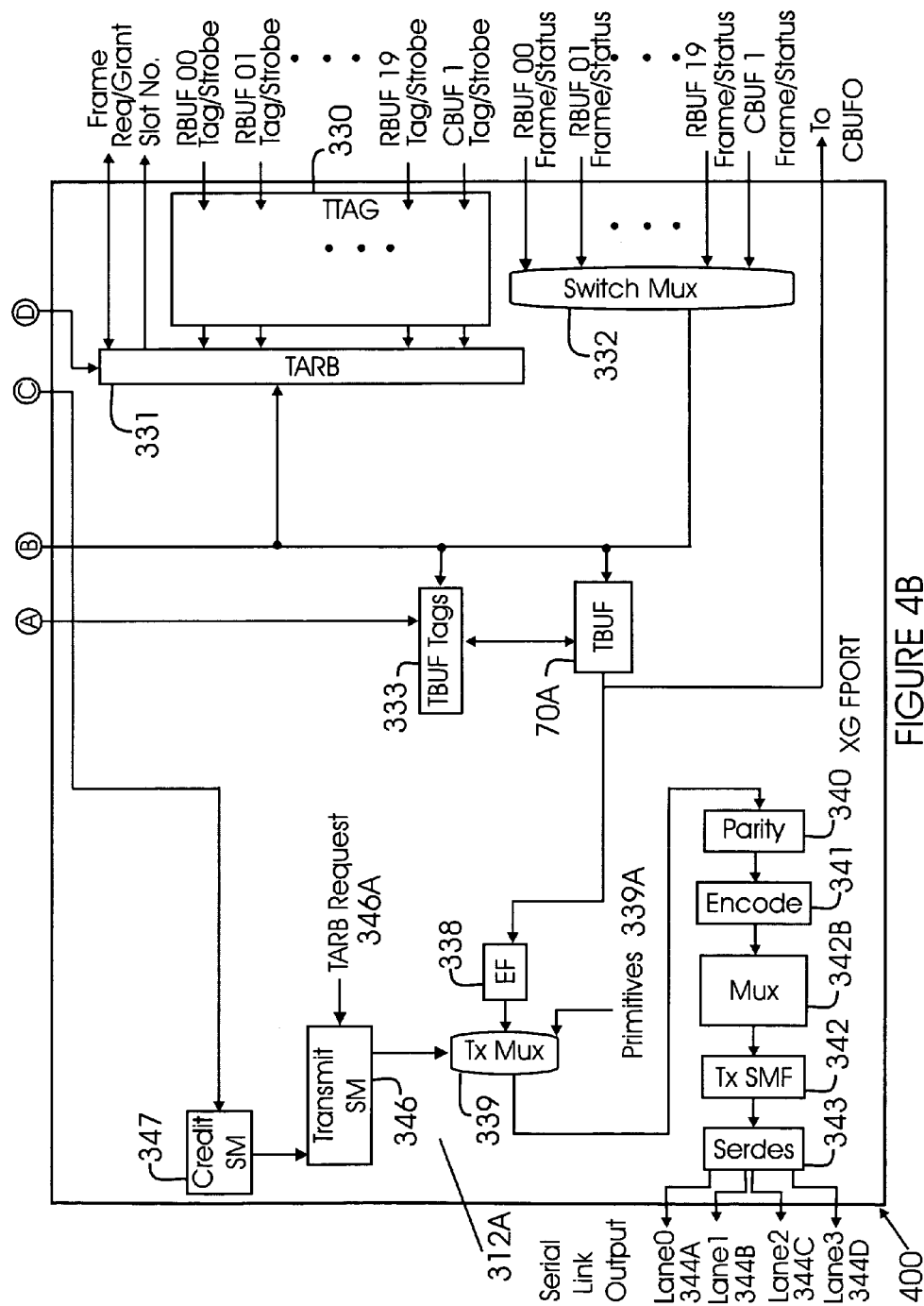

FIGS. 4A-4B (referred to as FIG. 4) show a block diagram of a 10G Fibre Channel port control module (XG FPORT) 400 used in ASIC 20. Various components of XG FPORT 400 are similar to GL port control module 300 that are described above. For example, RPORT 310 and 310A, Common Port 311 and 311A, and TPORT 312 and 312A have common modules as shown in FIGS. 3 and 4 with similar functionality.

RPORT 310A can receive frames from links (or lanes) 301A-301D and transmit frames to lanes 344A-344D. Each link has a SERDES (302A-302D), a de-skew module, a decode module (303B-303E) and parity module (304A-304D). Each lane also has a smoothing FIFO (SMF) module 305A-305D that performs smoothing functions to accommodate clock frequency variations. Parity errors are checked by module 403, while CRC errors are checked by module 404.

RPORT 310A uses a virtual lane ("VL") cache 402 that stores plural vector values that are used for virtual lane assignment. In one aspect of the present invention, VL Cache 402 may have 32 entries and two vectors per entry. IOP 66 is able to read or write VL cache 402 entries during frame traffic. State machine 401 controls credit that is received. On the transmit side, credit state machine 347 controls frame transmission based on credit availability. State machine 347 interfaces with credit counters 328A.

Also on the transmit side, modules 340-343 are used for each lane 344A-344D, i.e., each lane can have its own module 340-343. Parity module 340 checks for parity errors and encode module 341 encodes 8-bit data to 10 bit data. Mux 342B sends the 10-bit data to a smoothing ("TxSMF") module 342 that handles clock variation on the transmit side. SERDES 343 then sends the data out to the link.

Frame Routing Based on Aging:

As frames enter Receive Buffers (RBUF 69A), they are subjected to an aging process, according to one aspect of the present invention. This process keeps track of every frames age in RBUF 69A. Age in this context means how long the frames have been in a buffer with respect to each other. The purpose of this feature is to reduce a frame's maximum latency in RBUF 69A. Frames that have resided in a buffer for longer periods are assigned a higher read priority than frames that have been in the buffer for shorter periods.

Figure 5B:
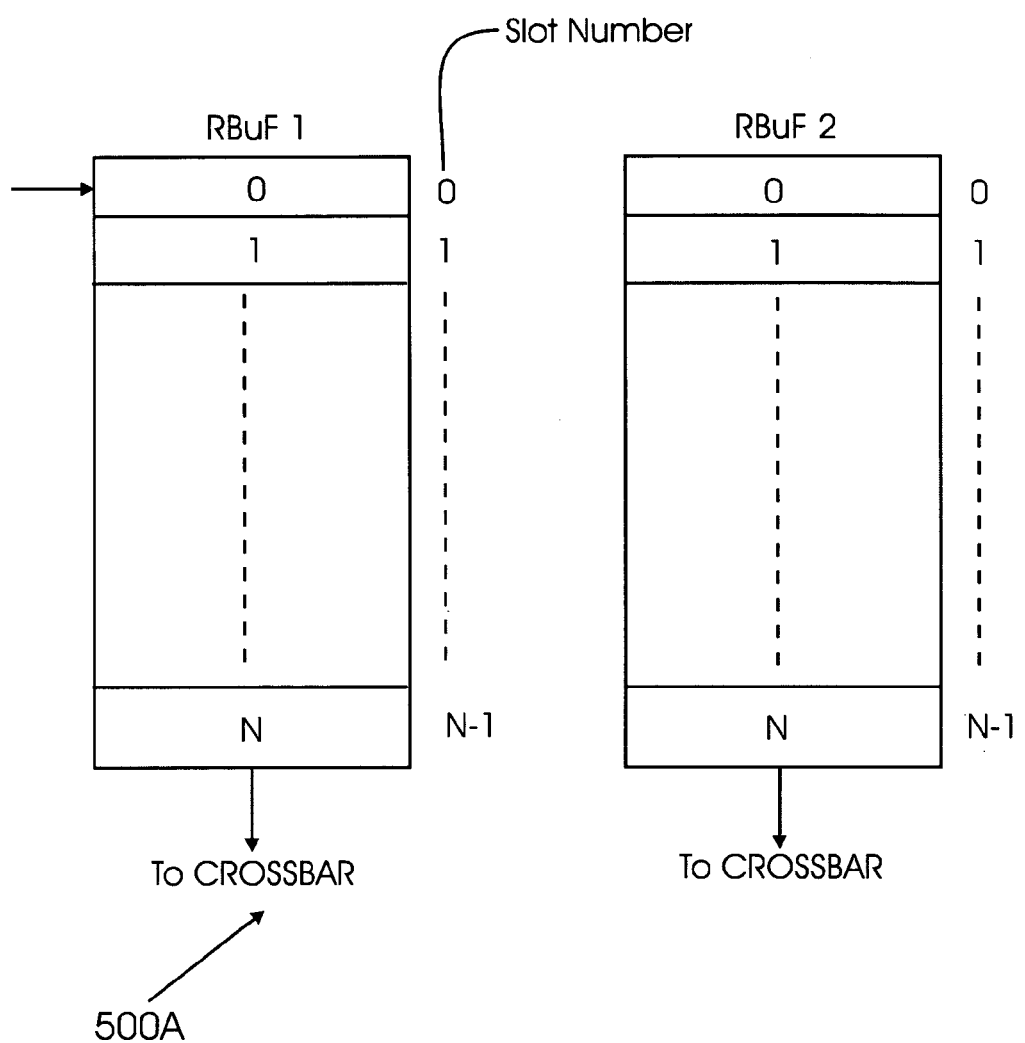
FIG. 5B shows a block diagram of receive buffers, used according to one aspect of the present invention.

In one aspect of the present invention, aging information may be kept in a 28-bit table. This table can maintain aging information on 8 frames. FIG. 5A shows an example of one such table 500 that can be used to store aging information. Table 500 can be stored in RBUF 69A.

Each RBUF 69A slot is labeled 0-N−1 (see FIG. 5B where 500A shows two buffers RBUF1 and RBUF2), and has an associated tag field, also labeled 0-N−1, which is maintained in RTAG 318. RTAGs are used for monitoring, controlling and ultimately transferring the frame to the intended destination(s).

The bits in the table represent the relative age of data in 2 slots. Thus Age_xy is 1 if slot x is older than slot y, or 0 if slot y is older than slot x.

Since Age_xy is the opposite value of Age_yx, both values (i.e Age_xy and Age_yx) are not needed. Age_xy is also not needed if x=y. Hence, if the aging table is represented as a grid (FIG. 5A, Table 500), only the Age_xy entries where x<y are used. If there are N slots in use, the number of bits for Table 500 is $((N*N)-N)/2$.

Table 500 also has rows and columns identified by the slot number. The entry for Age_xy is in column x and row y. Table 500 is changed whenever an RBUF 69A slot is written with a received frame. If slot y is written, all table entries in row y are set to 1. This marks all the Age_xy entries where x<y, as x older than y. Also, all table entries in column y are cleared to 0. This marks all the Age_yx entries where y<x, as x being older than y.

As an example, if slot 4 is written in an 8 slot RBUF 69A, as shown in FIG. 5A, Age04, Age14, Age24, and Age34 (the entries in row 4) are all set to 1. Age45, Age46, and Age47 (the entries in column 4) are all set to 0. Thus, all age entries that refers to slot 4 mark the other slot as being older.

FIGS. 5A and 6 show how bits in an 8-slot table are written when a frame is written into a RBUF 69A slot.

If only one Transmit Port requests a slot, then aging analysis is discarded, and the Receive Port sends that frame to the crossbar. However, if multiple Transmit Ports request different slots within the same request period, then the aging table is examined and the slot with the oldest frame resident will be sent to the crossbar first and this reduces both frame latency and congestion.

In one aspect of the present invention, RBUF 69A may be arranged as two occurrences of a SRAM (static random access memory), each with its own read and write counters and control. Some attributes of RBUF 69A are as follows.

Any single frame can be transferred to any combination of multiple (2-21) destinations simultaneously.

Only 2 frames, 1 from each SRAM, can be transferred to different destinations simultaneously.

In an unloaded system, where all destinations are idle, a frame is requested at the same time by all of its destinations. All multiple destinations are served simultaneously since all requests for a frame arrive simultaneously in RBUF Read Control 319.

When multiple requests are made for different slots in the same SRAM; frame age is used to arbitrate between the multiple requests. In one aspect, the request or requests for the oldest frame has the highest priority.

If multiple transmitter ports request data from multiple slots at the same time, the aging table is used to select the slot with the oldest frame to send first.

The following criteria are used to determine if slot y is the oldest requested slot number (refer to FIG. 5A, Table 500):

If slot x is a requested slot number:

For each slot y that is a requested slot and is not equal to x;

If the frame in slot x is older than the frame in slot y, then Age_xy is 1; and

If the frame in slot y is older than the frame in slot x, then Age_xy is 0.

In FIG. 6, during steps S600, S602, S604, S606, S608, S610, S612 and S614, all slots 0-7 are written. Plural age bits are set when the slots are written, as shown in steps S601, S603, S605, S607, S609, S611, S613 and S615, respectively. For example, slot 0 is written in step S600, and in step S601, age bits (Age01-Age 07)=0. In step S602, slot 1 is written, then in step S603, Age01=1 and Age12-17=0.

Figures 1, 1E, 2:
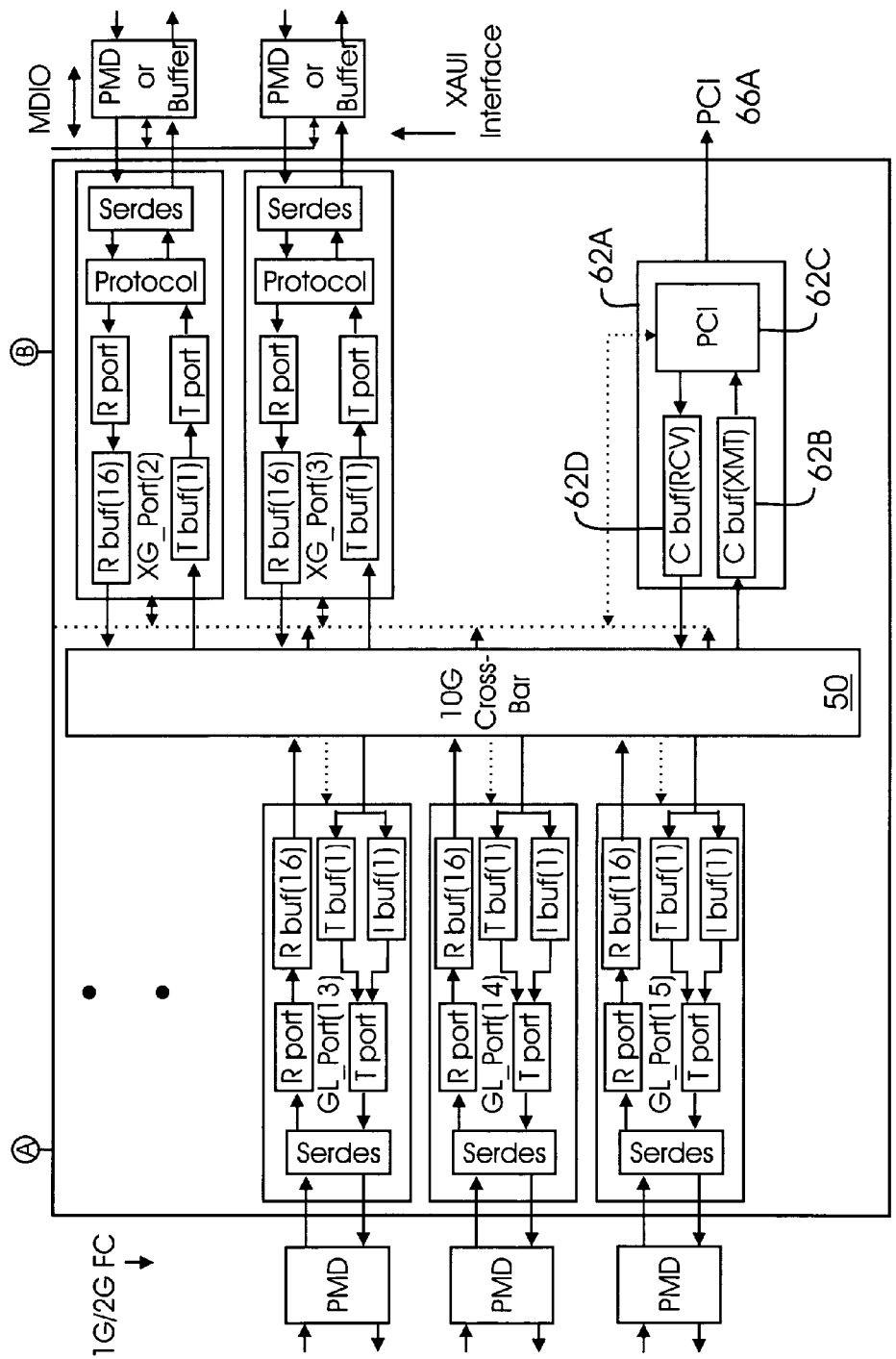
FIGS. 2-i-2-iv (jointly referred to as FIG. 2) show a process flow diagram for performing an age based frame analysis, according to one aspect of the present invention.

The flow diagram in FIG. 2 shows the process for determining the oldest slot. Steps S200, S200A-200D show when Slot 0 is selected (S200E), i.e. when a request for Slot 0=1, Slot 1=0 or Age01=1 (S200A), request for Slot 2=0 or Age 02=1 (S200B), request for slot 3=0 or Age03=1 (S200C) and so forth until slot 7=0 or Age 07=1 (S200D).

Steps S201, S201A-S201E shows the conditions when Slot 1 is selected. Steps S202, S202A-S202E show when Slot 2 is selected; steps S203, S203A-S203E show when Slot 3 is selected; steps S204, S204A-S204E show when Slot 6 is selected; and steps S205, S205A-S205E show when slot 7 is selected.

Although FIG. 2 shows 8 slots (0-7), the adaptive aspects of present invention are not limited to any particular number of slots.

It is noteworthy that hardware using combinatorial logic may be used to implement the FIG. 2 process steps. The hardware solution may be faster than firmware/software implementing the process steps of FIG. 2.

In one aspect of the present invention, an age based network data packet buffer priority scheme is provided that reduces frame latency and congestion.

Although the present invention has been described with reference to specific embodiments, these embodiments are illustrative only and not limiting. Many other applications and embodiments of the present invention will be apparent in light of this disclosure and the following claims.

What is claimed is:

1. A method for routing fibre channel frames using a fibre channel switch element having a plurality of ports, each port including a receive segment for receiving a fibre channel frame and a transmit segment for transmitting a fibre channel frame, comprising:
   storing a relative age of a first fibre channel frame with respect to a second fibre channel frame;
   wherein the first fibre channel frame and the second fibre channel frame are received by the receive segment of a port from among the plurality of ports; and the first frame is stored in a first memory slot of a receive buffer having a plurality of memory slots and the second frame is stored in a second memory slot of the receive buffer;
   wherein the relative age is stored in an aging table and the relative age indicates how long a fibre channel frame has been waiting at a memory slot compared to other fibre channel frames that are waiting in other memory slots at any given time;
   determining if more than one transmit segment is requesting fibre channel frames stored in the plurality of memory slots;
   if only one transmit segment requests a fibre channel frame stored at a memory slot, then routing the frame to the transmit segment without using the aging table;
   if more than one transmit segment is requesting fibre channel frames then using the aging table to determine which fibre channel frame is the oldest among the plurality of fibre channel frames stored in the plurality of memory slots;
   transmitting the oldest fibre channel frame from a memory slot based on the relative age obtained from the aging table; and setting age bits in the aging table when fibre channel frames are written in the receive segment; and the relative age for a fibre channel frame is determined based on a value of the age bits; wherein the aging table includes a grid having a plurality of rows and a plurality of columns and the grid stores the age bits, and wherein each row and column of the aging table is identified by a memory slot number.

2. The method of claim 1, wherein the aging table is stored within a receive buffer of the receive segment for each of the plurality of ports.

3. The method of claim 1, wherein an age bit value stored at a grid location indicates an age of a fibre channel frame stored at a memory slot with respect an age of another frame stored at another memory slot.

4. A fibre channel switch element for routing fibre channel frames, comprising:
   a plurality of ports, each port having a receive segment for receiving a fibre channel frame and a transmit segment for transmitting a fibre channel frame, where each receive segment includes a buffer having a plurality of memory slots for receiving the fibre channel frames,
   wherein each port includes an aging table for storing relative age of a frame stored at a memory slot and the relative age indicates how long a fibre channel frame has been waiting at a memory slot compared to how long other fibre channel frames are waiting in other memory slots at any given time; and
   wherein before transferring a fibre channel frame, the receive segment of the port determines if more than one transmit segment is requesting fibre channel frames stored in the plurality of memory slots; and if only one transmit segment requests a fibre channel frame stored at a memory slot, then the frame is routed without using the aging table; but if more than one transmit segment is requesting fibre channel frames then the receive segment uses the aging table to determine which fibre channel frame is the oldest among the plurality of fibre channel frames stored in the plurality of memory slots; and the oldest fibre channel frame is transmitted from a memory slot based on the relative age obtained from the aging table, wherein age bits are set when fibre channel frames are written in the receive segment of each port and the relative age for the fibre channel frames is determined based on a value of the age bits; wherein the aging table includes a grid having a plurality of rows and plurality of columns; and the grid stores the age bits, and wherein each row and column of the aging table is identified by a memory slot number.

5. The switch element of claim 4, wherein the aging table is stored within a receive buffer of the receive segment for each of the plurality of ports.

6. The switch element of claim 4, wherein an age bit value stored at a grid location indicates an age of a fibre channel frame stored at a memory slot with respect an age of another frame stored at another memory slot.

7. A method for routing fibre channel frames using a fibre channel switch element having a plurality of ports, each port including a receive segment for receiving a fibre channel frame and a transmit segment for transmitting a fibre channel frame, comprising:
   storing a relative age of a first fibre channel frame with respect to a second fibre channel frame;
   wherein the first fibre channel frame and the second fibre channel frame are received by the receive segment of a port from among the plurality of ports; and the first frame is stored in a first memory slot of a receive buffer having plurality of memory slots and the second frame is stored in a second memory slot of the receive buffer;
   wherein the relative age is stored in an aging table and the relative age indicates how long a fibre channel frame has been waiting at a memory slot compared to other fibre channel frames that are waiting in other memory slots at any given time;

determining if more than one transmit segment is requesting fibre channel frames stored in the plurality of memory slots;

if only one transmit segment requests a fibre channel frame stored at a memory slot, then routing the frame to the transmit segment without using the aging table;

if more than one transmit segment is requesting fibre channel frames then using the aging table to determine which fibre channel frame is the oldest among the plurality of fibre channel frames stored in the plurality of memory slots; and transmitting the oldest fibre channel frame from a memory slot based on the relative age obtained from the aging table; wherein if there are N number of memory slots, then (N*N)−N)/2 bits are used to populate the aging table.

8. A fibre channel switch element for routing fibre channel frames, comprising:

a plurality of ports, each port having a receive segment for receiving a fibre channel frame and a transmit segment for transmitting a fibre channel frame, where each receive segment includes a buffer having a plurality of memory slots for receiving the fibre channel frames;

wherein each port includes an aging table for storing a relative age of a frame stored at a memory slot and the relative age indicates how long a fibre channel frame has been waiting at a memory slot compared to how long other fibre channel frames are waiting in other memory slot at any given time; and wherein before transferring a fibre channel frame, the receive segment of the port determines if more than one transmit segment is requesting fibre channel frames stored in the plurality of memory slots; and if only one transmit segment requests a fibre channel frame stored at a memory slot, then the frame is routed without using the aging table; but if more than on transmit segment is requesting fibre channel frames then the receive segment uses the aging table to determine which fibre channel frame is the oldest among the plurality of fibre channel frames stored in the plurality of memory slots; and the oldest fibre channel frame is transmitted from a memory slot based on the relative age obtained from the aging table; wherein if there are N number of memory slots, then ((N*N)−N)/2) bits are used to populate the aging table.

9. A port for a switch element operationally coupled to a network for sending and receiving network frames, comprising:

a receiving segment for receiving a network frame;
a transmit segment for transmitting a network frame;
wherein the receive segment includes:
(a) a buffer having a plurality of memory slots for receiving the network frames; and
(b) an aging table for storing a relative age of a network frame stored at a memory slot and the relative age indicates how long a network frame has been waiting at a memory slot compared to how long other network frames are waiting in other memory slots from among the plurality of memory slots, at any given time;

wherein before transferring a network frame, the port determine if more than one transmit segment is requesting network frames stored in the plurality of memory slots; and if only one transmit segment requests a network frame stored at a memory slot, then the network frame is routed without using the aging table; but if more than one transmit segment is requesting network frames then the receive segment uses the aging table to determine which network frame is the oldest among the plurality of network frames stored in the plurality of memory slots; and the oldest fibre channel frame is transmitted from a memory slot based on the relative age obtained from the aging table, wherein age bits are set in the aging table when network frames are written in the receive segment and the relative age for the network frames is determined based on a value of the age bits, and wherein the aging table includes a grid having a plurality of rows and a plurality of columns identified by memory slot numbers and the grid stores the age bits.

10. A port for a switch element operationally coupled to network for sending and receiving network frames, comprising:

a receive segment for receiving a network frame;
a transmit segment for transmitting a network frame;
wherein the receive segment includes:
(a) a buffer having a plurality of memory slots for receiving the network frames; and
(b) an aging table for storing a relative age of a network frame stored at a memory slot and the relative age indicates how long a network frame has been waiting at a memory slot compared to how long other network frames are waiting in other memory slots from among the plurality of memory slots, at any given time;

wherein before transferring a network frame, the port determines if more than one transmit segment is requesting network frames stored in the plurality of memory slots; and if only one transmit segment requests a network frame stored at a memory slot, then the network frame is routed without using the aging table; but if more than one transmit segment is requesting network frames then the receive segment uses the aging table to determine which network frame is the oldest among the plurality of network frames stored in the plurality of memory slots; and the oldest fibre channel frame is transmitted from a memory slot based on the relative age obtained from the aging table, wherein age bits are set in the aging table when network frames are written in the receive segment of the relative age for the network frames is determined based on a value of the age bits, wherein if there are N number of memory slots, then ((N*N)−N)/2 bits are used to populate the aging table.

* * * * *

UNITED STATES PATENT AND TRADEMARK OFFICE
CERTIFICATE OF CORRECTION

PATENT NO. : 7,522,522 B2
APPLICATION NO. : 10/894595
DATED : April 21, 2009
INVENTOR(S) : Frank R. Dropps et al.

It is certified that error appears in the above-identified patent and that said Letters Patent is hereby corrected as shown below:

On page 4, in column 2, under "Other Publications", line 12, delete "Appl.e" and insert -- Appl. --, therefor.

On page 4, in column 2, under "Other Publications", line 27, delete "UPSTO" and insert -- USPTO --, therefor.

On page 4, in column 2, under "Other Publications", line 43, delete "Distiguished" and insert -- Distinguished --, therefor.

On page 5, in column 1, under "Other Publications", line 50, delete "Allownace" and insert -- Allowance --, therefor.

In column 3, line 54, delete "2-$i$-2-$iv$" and insert -- 2-$i$/2-$iv$ --, therefor.

In column 12, line 18, in claim 4, delete "storing" and insert -- storing a --, therefor.

In column 12, line 41, in claim 4, delete "and" and insert -- and a --, therefor.

In column 12, line 64, in claim 7, delete "having" and insert -- having a --, therefor.

In column 13, line 18, in claim 7, delete "(N*N)-N)/2" and insert -- ((N*N)-N)/2 --, therefor.

In column 13, line 32, in claim 8, delete "slot" and insert -- slots --, therefor.

In column 13, line 39, in claim 8, delete "on" and insert -- one --, therefor.

In column 13, line 52, in claim 9, delete "receiving" and insert -- receive --, therefor.

In column 14, line 6, in claim 9, delete "determine" and insert -- determines --, therefor.

Signed and Sealed this

Ninth Day of November, 2010

David J. Kappos
*Director of the United States Patent and Trademark Office*

In column 14, line 25, in claim 10, delete "to" and insert -- to a --, therefor.

In column 14, line 54, in claim 10, delete "of" and insert -- and --, therefor.